US008743471B2

(12) United States Patent
Imaoka

(10) Patent No.: US 8,743,471 B2
(45) Date of Patent: Jun. 3, 2014

(54) ZOOM LENS SYSTEM, INTERCHANGEABLE LENS APPARATUS AND CAMERA SYSTEM

(75) Inventor: Takuya Imaoka, Kanagawa (JP)

(73) Assignee: Panasonic Corporation, Kadoma-shi (JP)

( * ) Notice: Subject to any disclaimer, the term of this patent is extended or adjusted under 35 U.S.C. 154(b) by 206 days.

(21) Appl. No.: 13/334,075

(22) Filed: Dec. 22, 2011

(65) Prior Publication Data

US 2012/0162779 A1 Jun. 28, 2012

(30) Foreign Application Priority Data

Dec. 22, 2010 (JP) ................... 2010-286702

(51) Int. Cl.
*G02B 15/14* (2006.01)
(52) U.S. Cl.
USPC .......................................... 359/684; 359/676
(58) Field of Classification Search
USPC ................... 359/676, 680–682, 684, 686
See application file for complete search history.

(56) References Cited

U.S. PATENT DOCUMENTS

2006/0221461 A1* 10/2006 Shibayama ................... 359/686

FOREIGN PATENT DOCUMENTS

| JP | H10-020194 A | 1/1998 |
| JP | 2004-246141 A | 9/2004 |
| JP | 2008-191301 A | 8/2008 |
| JP | 2008-233611 A | 10/2008 |

* cited by examiner

*Primary Examiner* — James Greece
(74) *Attorney, Agent, or Firm* — Judge Patent Associates

(57) ABSTRACT

A zoom lens system, in order from an object side to an image side, comprising a first lens unit having negative optical power, a second lens unit having positive optical power, a third lens unit having negative optical power, and a fourth lens unit having positive optical power, wherein the first lens unit moves along an optical axis, and the fourth lens unit is fixed relative to an image surface, in zooming from a wide-angle limit to a telephoto limit at the time of image taking, and the condition: $0.8 < |f_1/f_W| < 1.4$ ($f_1$: a composite focal length of the first lens unit, $f_W$: a focal length of the entire system at a wide-angle limit) is satisfied; an interchangeable lens apparatus; and a camera system are provided.

6 Claims, 17 Drawing Sheets

ZOOM LENS SYSTEM, INTERCHANGEABLE LENS APPARATUS AND CAMERA SYSTEM

CROSS-REFERENCE TO RELATED APPLICATION

This application is based on application No. 2010-286702 filed in Japan on Dec. 22, 2010, the contents of which are hereby incorporated by reference.

BACKGROUND OF THE INVENTION

1. Field of the Invention

The present invention relates to zoom lens systems, interchangeable lens apparatuses, and camera systems. In particular, the present invention relates to: compact and lightweight zoom lens systems having, as well as excellent optical performance, short overall length; and interchangeable lens apparatuses, and camera systems, each employing the zoom lens system.

2. Description of the Background Art

In recent years, interchangeable-lens type digital camera systems (also referred to simply as "camera systems", hereinafter) have been spreading rapidly. Such interchangeable-lens type digital camera systems realize: taking of high-sensitive and high-quality images; high-speed focusing and high-speed image processing after image taking; and easy replacement of an interchangeable lens apparatus in accordance with a desired scene. Meanwhile, an interchangeable lens apparatus having a zoom lens system that forms an optical image with variable magnification is popular because it allows free change of focal length without the necessity of lens replacement.

Zoom lens systems having excellent optical performance from a wide-angle limit to a telephoto limit have been desired as zoom lens systems to be used in interchangeable lens apparatuses. Various kinds of zoom lens systems each having a negative lens unit located closest to an object side, and a multiple-unit construction have been proposed.

For example, Japanese Laid-Open Patent Publication No. 2008-191301 discloses an imaging optical system having a three-or-more unit construction of negative, positive and negative lens units or negative, positive and positive lens units. In the optical system, a lens unit having negative optical power is located on the object side relative to a diaphragm, and the lens unit having negative optical power has a cemented lens composed of a plurality of lenses which are cemented with each other. Partial dispersion ratio and Abbe number of at least one lens constituting the cemented lens are set forth.

Japanese Laid-Open Patent Publication No. 2008-233611 discloses a variable magnification optical system having a four unit construction of negative, positive, negative and positive lens units. In the optical system, at least the second lens unit and the third lens unit move when the magnification varies from a wide-angle limit to a telephoto limit, and there is an overlap between an area of movement of the second lens unit and an area of movement of the third lens unit. The first lens unit is composed of one negative lens and one positive lens, the second lens unit is compose of at least two lenses, and the third lens unit is composed of one negative lens. Shape factor of the negative lens in the first lens unit, a focal length of the third lens unit and an average refractive index of the positive lens in the second lens unit are set forth.

In each of the imaging optical system and the variable magnification optical system disclosed in the above-mentioned patent literatures, however, the construction of the lens unit located closest to the object side makes it difficult to reduce the overall length of lens system although optical performance is maintained at a certain level. Thus, size reduction which is recently demanded is not achieved.

SUMMARY OF THE INVENTION

An object of the present invention is to provide: a compact and lightweight zoom lens system having, as well as excellent optical performance, short overall length; and an interchangeable lens apparatus, and a camera system, each employing the zoom lens system.

The novel concepts disclosed herein were achieved in order to solve the foregoing problems in the conventional art, and herein is disclosed:

a zoom lens system, in order from an object side to an image side, comprising a first lens unit having negative optical power, a second lens unit having positive optical power, a third lens unit having negative optical power, and a fourth lens unit having positive optical power, wherein the first lens unit moves along an optical axis, and the fourth lens unit is fixed relative to an image surface, in zooming from a wide-angle limit to a telephoto limit at the time of image taking, and the following condition (1) is satisfied:

$$0.8 < |f_1/f_W| < 1.4 \quad (1)$$

where $f_1$ is a composite focal length of the first lens unit, and $f_W$ is a focal length of the entire system at a wide-angle limit.

The novel concepts disclosed herein were achieved in order to solve the foregoing problems in the conventional art, and herein is disclosed:

an interchangeable lens apparatus comprising:

a zoom lens system; and a lens mount section which is connectable to a camera body including an image sensor for receiving an optical image formed by the zoom lens system and converting the optical image into an electric image signal, wherein the zoom lens system, in order from an object side to an image side, comprises a first lens unit having negative optical power, a second lens unit having positive optical power, a third lens unit having negative optical power, and a fourth lens unit having positive optical power, wherein the first lens unit moves along an optical axis, and the fourth lens unit is fixed relative to an image surface, in zooming from a wide-angle limit to a telephoto limit at the time of image taking, and the following condition (1) is satisfied:

$$0.8 < |f_1/f_W| < 1.4 \quad (1)$$

where $f_1$ is a composite focal length of the first lens unit, and $f_W$ is a focal length of the entire system at a wide-angle limit.

The novel concepts disclosed herein were achieved in order to solve the foregoing problems in the conventional art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal, wherein the zoom lens system, in order from an object side to an image side, comprises a first lens unit having negative optical power, a second lens unit having positive optical power, a third lens unit having negative optical power, and a fourth lens unit having positive optical power, wherein the first lens unit moves along an optical axis, and the fourth lens unit is fixed relative to an image surface, in zooming from a wide-angle limit to a telephoto limit at the time of image taking, and the following condition (1) is satisfied:

$$0.8 < |f_1/f_W| 1.4 \tag{1}$$

where $f_1$ is a composite focal length of the first lens unit, and $f_W$ is a focal length of the entire system at a wide-angle limit.

According to the present invention, it is possible to provide: a compact and lightweight zoom lens system having, as well as excellent optical performance, short overall length; and an interchangeable lens apparatus, and a camera system, each employing the zoom lens system.

BRIEF DESCRIPTION OF THE DRAWINGS

This and other objects and features of this invention will become clear from the following description, taken in conjunction with the preferred embodiments with reference to the accompanied drawings in which.

Figure 1:
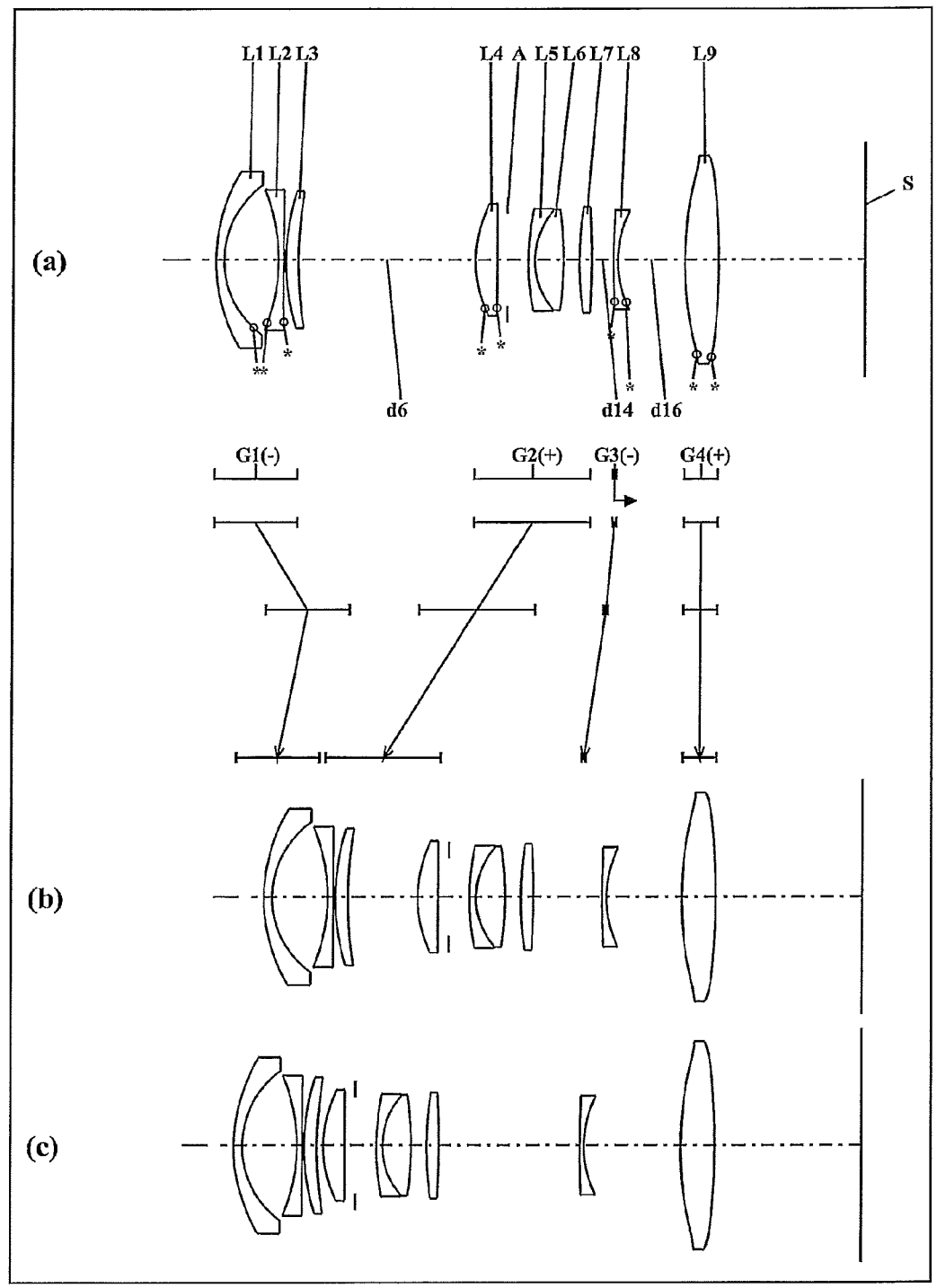
FIG. 1 is a lens arrangement diagram showing an infinity in-focus condition of a zoom lens system according to Embodiment 1 (Example 1)
Figure 2:
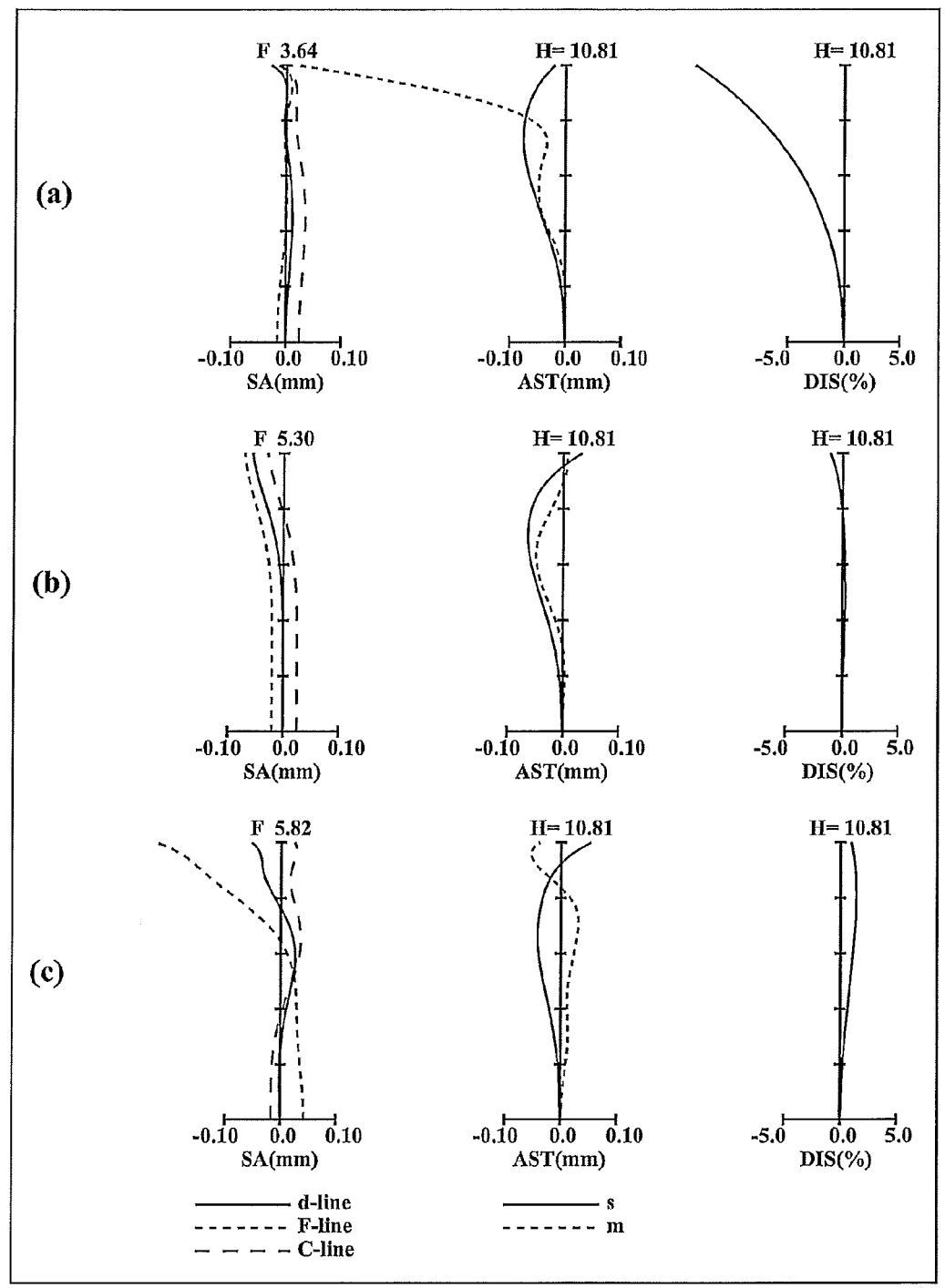
FIG. 2 is a longitudinal aberration diagram of an infinity in-focus condition of a zoom lens system according to Example 1.
Figure 3:
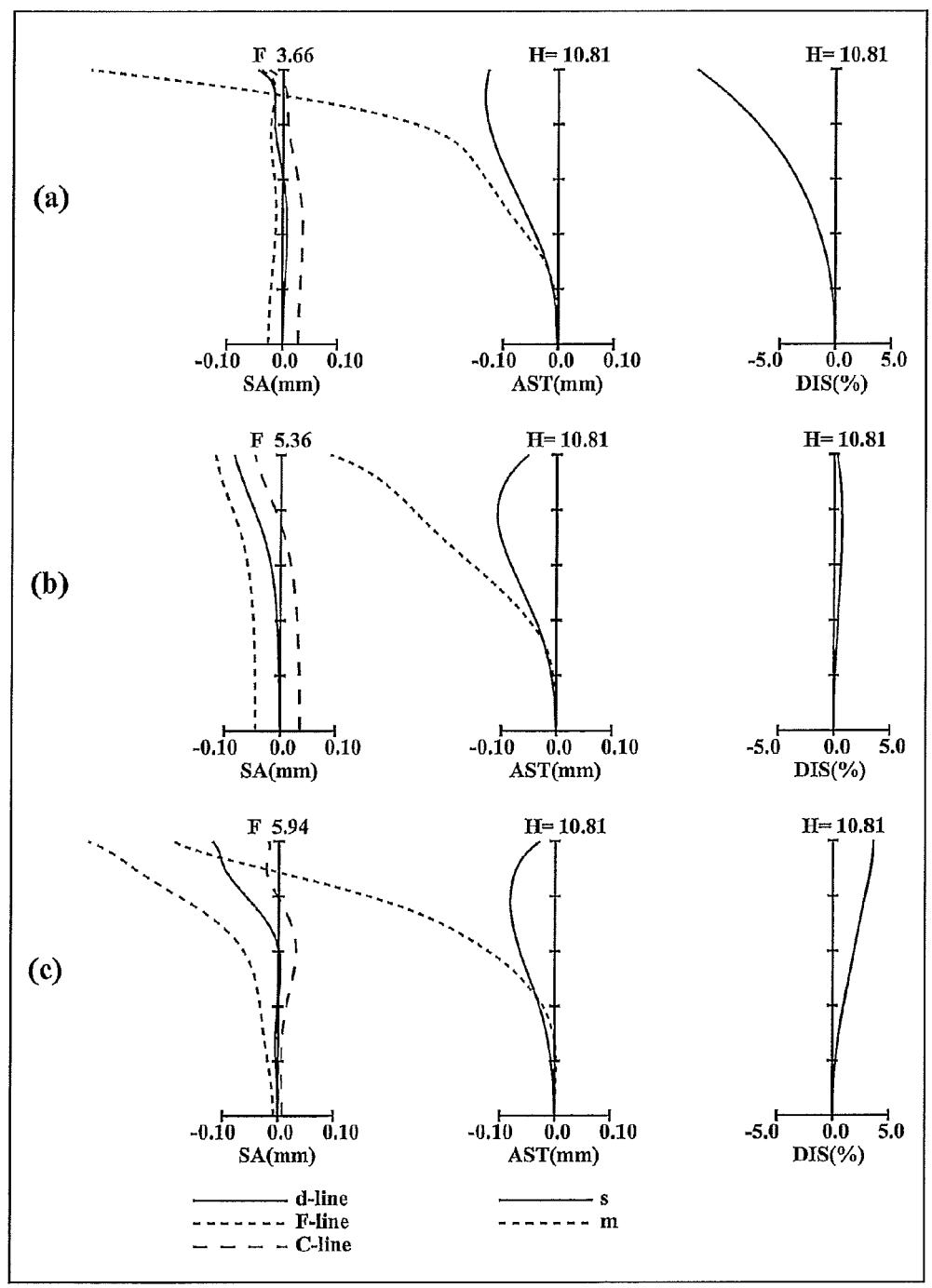
FIG. 3 is a longitudinal aberration diagram of a close-object in-focus condition of a zoom lens system according to Example 1.
Figure 4:
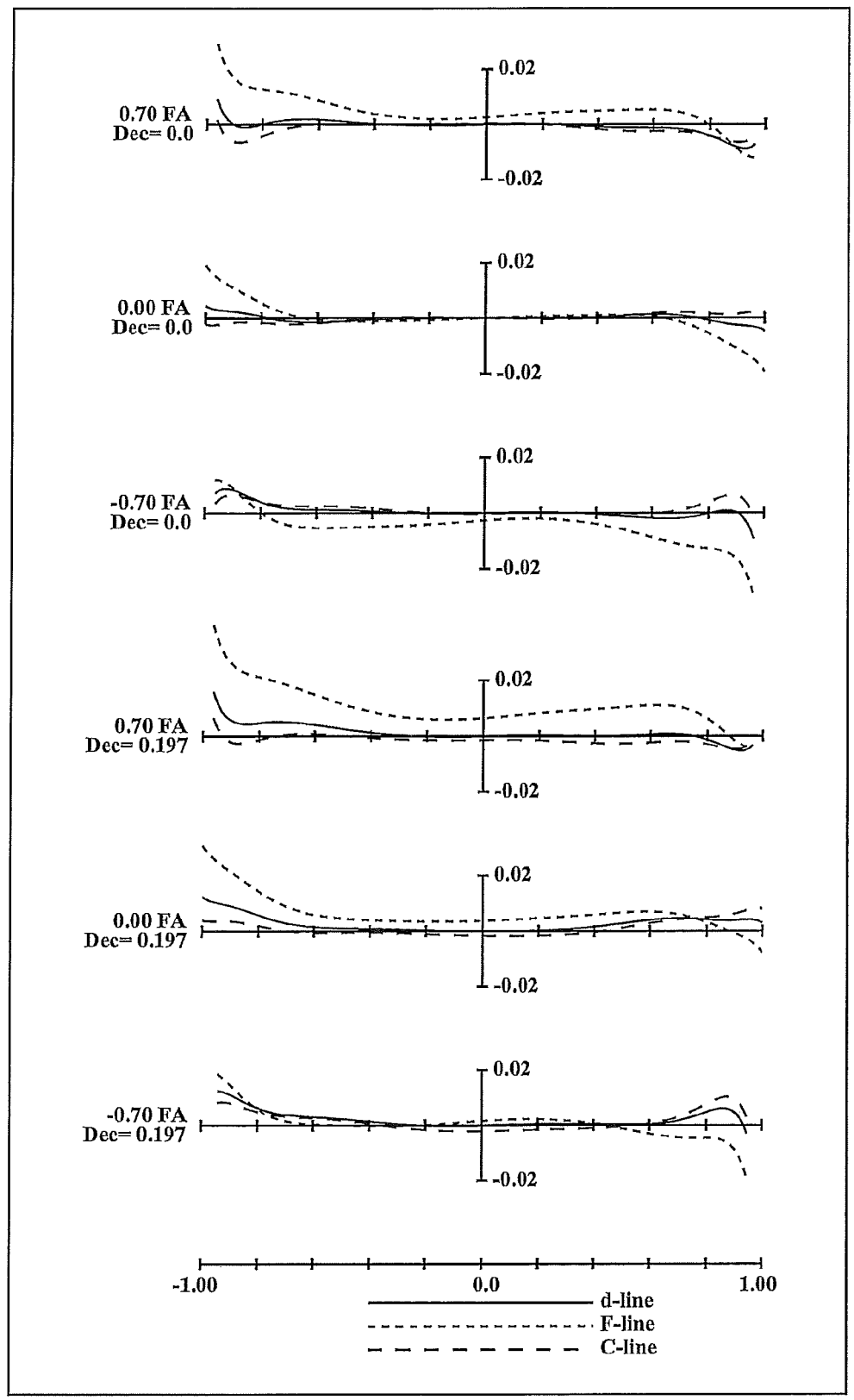
FIG. 4 is a lateral aberration diagram of a zoom lens system according to Example 1 at a telephoto limit in a basic state where image blur compensation is not performed and in an image blur compensation state.

DESCRIPTION OF THE PREFERRED EMBODIMENTS (Embodiments 1 to 4)

FIGS. 1, 5, 9, and 13 are lens arrangement diagrams of zoom lens systems according to Embodiments 1 to 4, respectively. Each FIG. shows a zoom lens system in an infinity in-focus condition.

In each FIG., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each FIG., each bent arrow located between part (a) and part (b) indicates a line obtained by connecting the positions of each lens unit respectively at a wide-angle limit, a middle position and a telephoto limit, in order from the top. In the part between the wide-angle limit and the middle position, and the part between the middle position and the telephoto limit, the positions are connected simply with a straight line, and hence this line does not indicate actual motion of each lens unit.

Moreover, in each FIG., an arrow imparted to a lens unit indicates focusing from an infinity in-focus condition to a close-object in-focus condition. That is, in FIGS. 1, 5, 9, and 13, the arrow indicates the moving direction of a third lens unit G3, which is described later, in focusing from an infinity in-focus condition to a close-object in-focus condition. In FIGS. 1, 5, 9, and 13, since the symbols of the respective lens units are imparted to part (a), the arrow indicating focusing is placed beneath each symbol of each lens unit for the convenience sake. However, the direction along which each lens unit moves in focusing in each zooming condition will be described later in detail for each embodiment.

The zoom lens system according to each of Embodiments 1 to 4, in order from the object side to the image side, comprises: a first lens unit G1 having negative optical power; a second lens unit G2 having positive optical power; a third lens unit G3 having negative optical power; and a fourth lens unit G4 having positive optical power. In the zoom lens system according to each embodiment, in zooming, the first lens unit G1, the second lens unit G2, and the third lens unit G3 individually move in the direction along the optical axis so that the intervals between the respective lens units, i.e., the interval between the first lens unit G1 and the second lens unit G2, the interval between the second lens unit G2 and the third lens unit G3, and the interval between the third lens unit G3 and the fourth lens unit G4 vary. In the zoom lens system according to each embodiment, these lens units are arranged in a desired optical power configuration, thereby achieving size reduction of the entire lens system while maintaining high optical performance.

In FIGS. 1, 5, 9, and 13, an asterisk "*" imparted to a particular surface indicates that the surface is aspheric. In each FIG., symbol (+) or (−) imparted to the symbol of each lens unit corresponds to the sign of the optical power of the lens unit. In each FIG., a straight line located on the most right-hand side indicates the position of an image surface S.

Further, as shown in FIGS. 1, 5, 9, and 13, an aperture diaphragm A is provided between a fourth lens element L4 and a fifth lens element L5 in the second lens unit G2.

As shown in FIG. 1, in the zoom lens system according to Embodiment 1, the first lens unit G1, in order from the object side to the image side, comprises: a negative meniscus first lens element L1 with the convex surface facing the object side; a negative meniscus second lens element L2 with the convex surface facing the image side; and a positive meniscus third lens element L3 with the convex surface facing the object side. Among these, the first lens element L1 has an aspheric image side surface, and the second lens element L2 has two aspheric surfaces.

In the zoom lens system according to Embodiment 1, the second lens unit G2, in order from the object side to the image side, comprises: a bi-convex fourth lens element L4; a negative meniscus fifth lens element L5 with the convex surface facing the object side; a bi-convex sixth lens element L6; and a bi-convex seventh lens element L7. Among these, the fifth lens element L5 and the sixth lens element L6 are cemented with each other. The fourth lens element L4 has two aspheric surfaces. Further, an aperture diaphragm A is provided between the fourth lens element L4 and the fifth lens element L5.

In the zoom lens system according to Embodiment 1, the third lens unit G3 comprises solely a negative meniscus eighth lens element L8 with the convex surface facing the object side. The eighth lens element L8 has two aspheric surfaces.

In the zoom lens system according to Embodiment 1, the fourth lens unit G4 comprises solely a bi-convex ninth lens element L9. The ninth lens element L9 has two aspheric surfaces.

In the zoom lens system according to Embodiment 1, the seventh lens element L7 as a component of the second lens unit G2 corresponds to an image blur compensating lens unit described later, which moves in a direction perpendicular to the optical axis in order to optically compensate image blur.

In the zoom lens system according to Embodiment 1, in zooming from a wide-angle limit to a telephoto limit at the time of image taking, the first lens unit G1 moves with locus of a convex to the image side, the second lens unit G2 monotonically moves to the object side, the third lens unit G3 monotonically and slightly moves to the object side, and the fourth lens unit G4 is fixed relative to the image surface S. That is, in zooming, the first lens unit G1, the second lens unit G2, and the third lens unit G3 individually move along the optical axis such that the interval between the first lens unit G1 and the second lens unit G2 decreases, the interval between the second lens unit G2 and the third lens unit G3 increases, and the interval between the third lens unit G3 and the fourth lens unit G4 varies.

Further, in the zoom lens system according to Embodiment 1, in focusing from an infinity in-focus condition to a close-object in-focus condition, the third lens unit G3 moves to the image side along the optical axis in any zooming condition.

Figure 5:
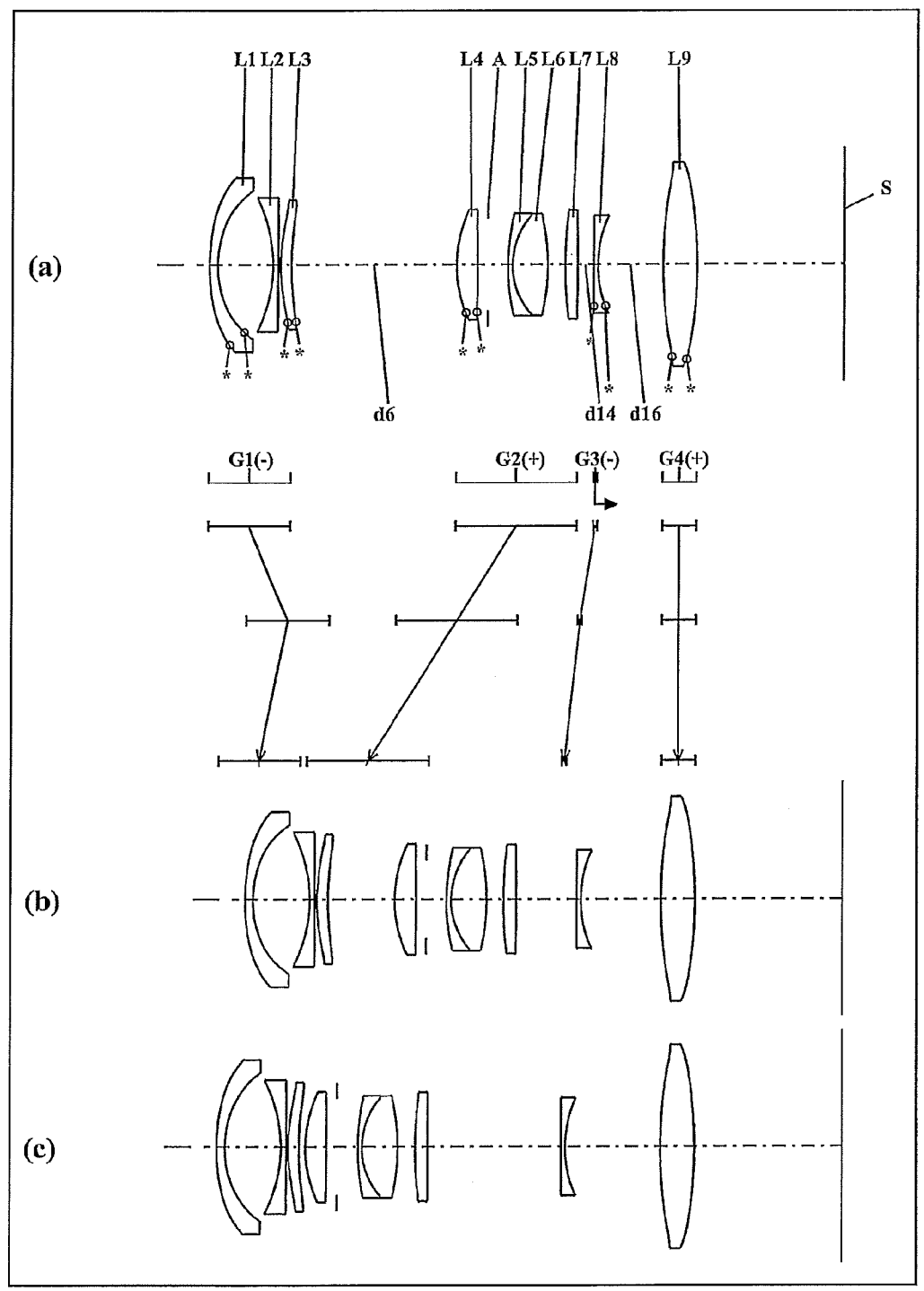
FIG. 5 is a lens arrangement diagram showing an infinity in-focus condition of a zoom lens system according to Embodiment 2 (Example 2)
Figure 6:
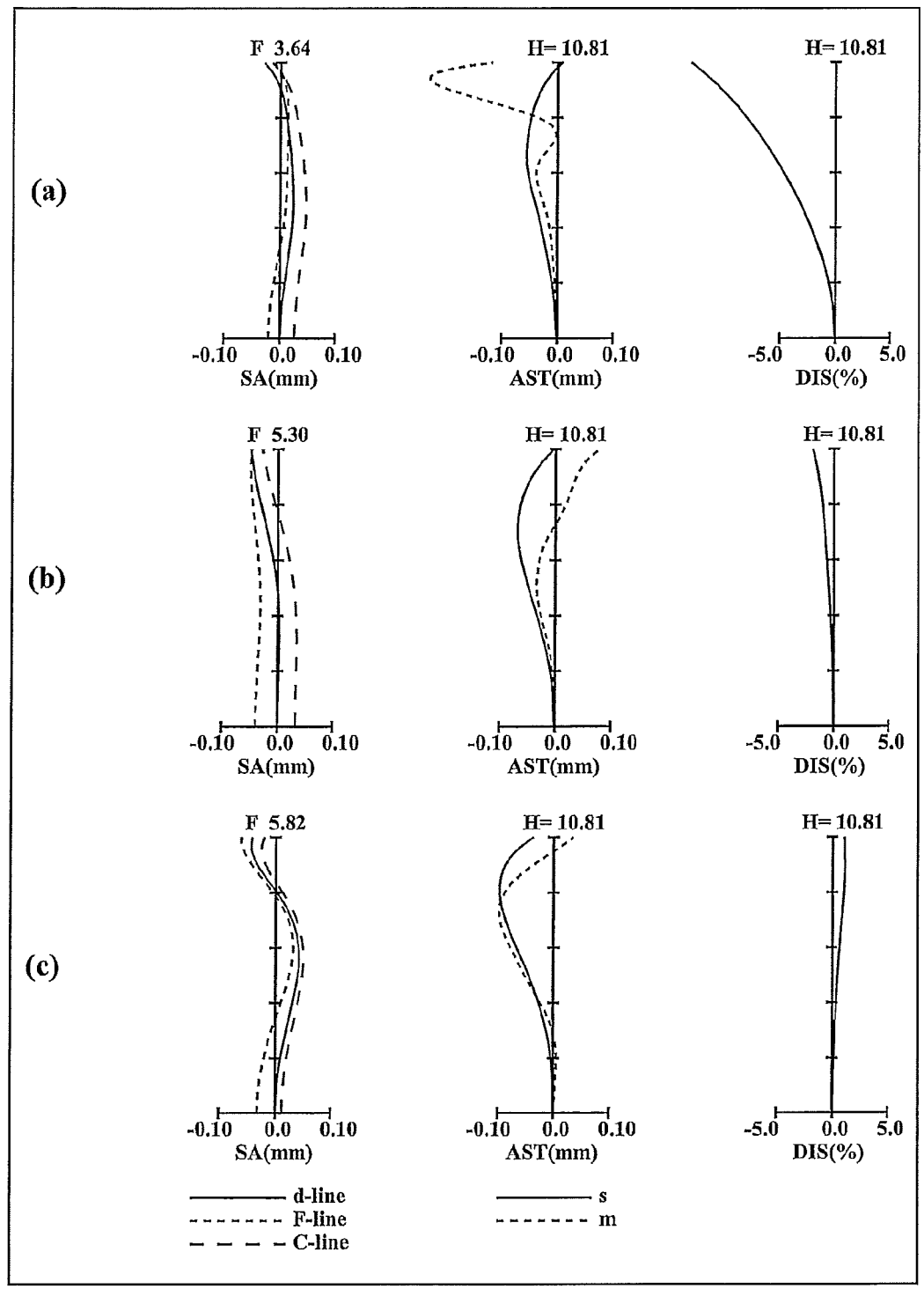
FIG. 6 is a longitudinal aberration diagram of an infinity in-focus condition of a zoom lens system according to Example 2.
Figure 7:
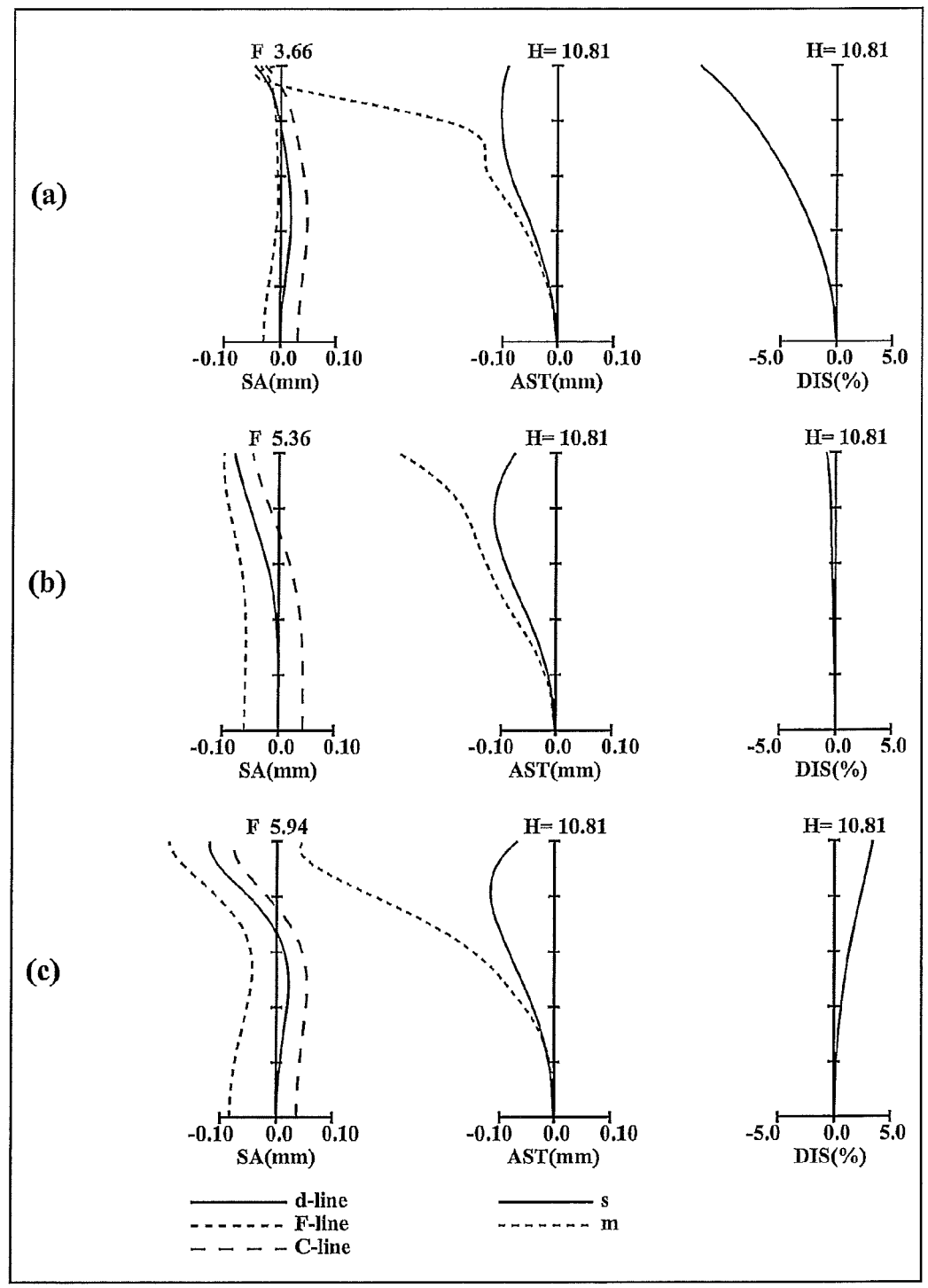
FIG. 7 is a longitudinal aberration diagram of a close-object in-focus condition of a zoom lens system according to Example 2.
Figure 8:
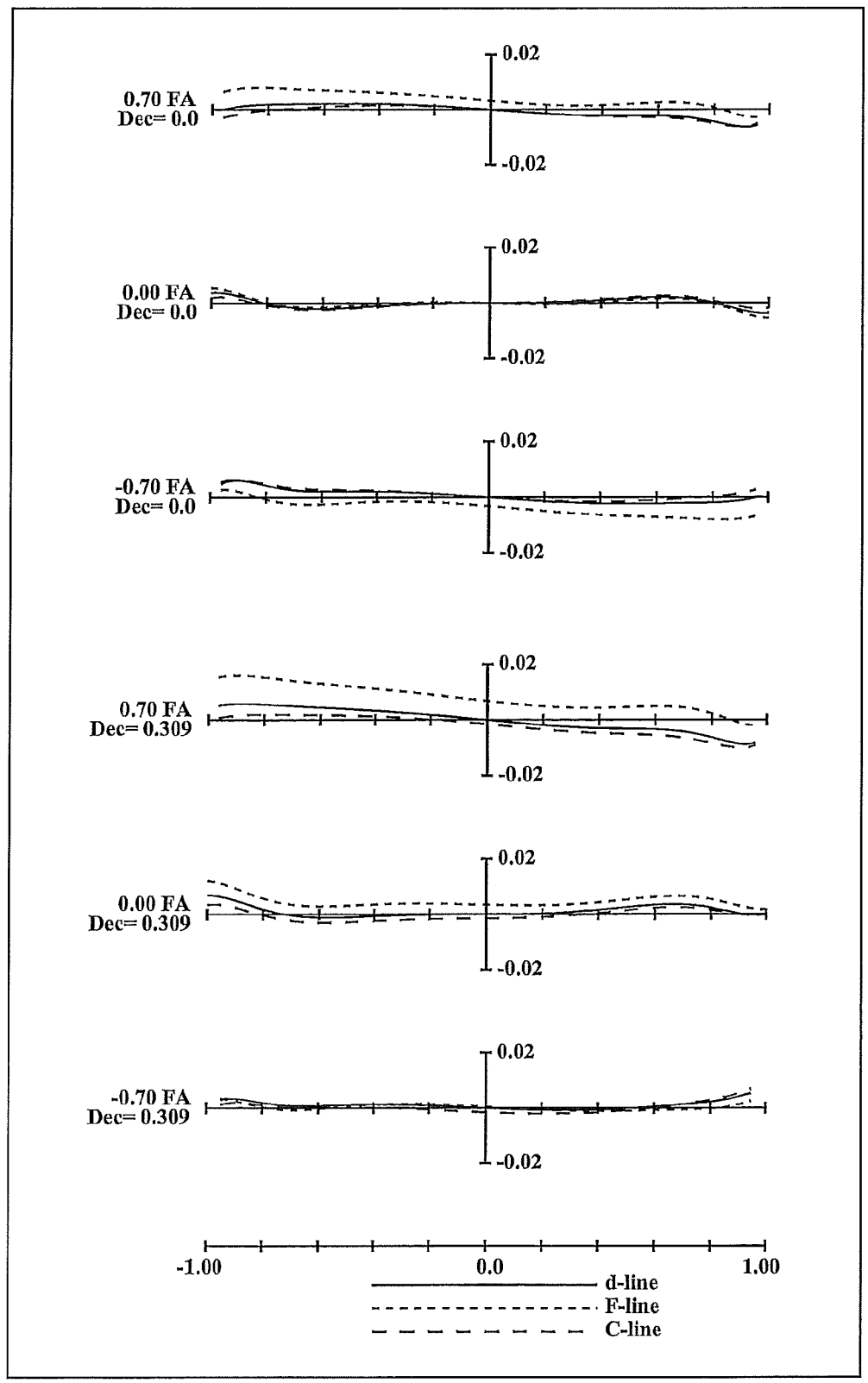
FIG. 8 is a lateral aberration diagram of a zoom lens system according to Example 2 at a telephoto limit in a basic state where image blur compensation is not performed and in an image blur compensation state.

As shown in FIG. 5, in the zoom lens system according to Embodiment 2, the first lens unit G1, in order from the object side to the image side, comprises: a negative meniscus first lens element L1 with the convex surface facing the object side; a negative meniscus second lens element L2 with the convex surface facing the image side; and a positive meniscus third lens element L3 with the convex surface facing the object side. Among these, the first lens element L1 and the third lens element L3 each have two aspheric surfaces.

In the zoom lens system according to Embodiment 2, the second lens unit G2, in order from the object side to the image side, comprises: a bi-convex fourth lens element L4; a negative meniscus fifth lens element L5 with the convex surface facing the object side; a bi-convex sixth lens element L6, and a bi-convex seventh lens element L7. Among these, the fifth lens element L5 and the sixth lens element L6 are cemented with each other. The fourth lens element L4 has two aspheric surfaces. Further, an aperture diaphragm A is provided between the fourth lens element L4 and the fifth lens element L5.

In the zoom lens system according to Embodiment 2, the third lens unit G3 comprises solely a bi-concave eighth lens element L8. The eighth lens element L8 has two aspheric surfaces.

In the zoom lens system according to Embodiment 2, the fourth lens unit G4 comprises solely a bi-convex ninth lens element L9. The ninth lens element L9 has two aspheric surfaces.

In the zoom lens system according to Embodiment 2, the seventh lens element L7 as a component of the second lens unit G2 corresponds to an image blur compensating lens unit described later, which moves in a direction perpendicular to the optical axis in order to optically compensate image blur.

In the zoom lens system according to Embodiment 2, in zooming from a wide-angle limit to a telephoto limit at the time of image taking, the first lens unit G1 moves with locus of a convex to the image side, the second lens unit G2 monotonically moves to the object side, the third lens unit G3 monotonically and slightly moves to the object side, and the fourth lens unit G4 is fixed relative to the image surface S. That is, in zooming, the first lens unit G1, the second lens unit G2, and the third lens unit G3 individually move along the optical axis such that the interval between the first lens unit G1 and the second lens unit G2 decreases, the interval between the second lens unit G2 and the third lens unit G3 increases, and the interval between the third lens unit G3 and the fourth lens unit G4 varies.

Further, in the zoom lens system according to Embodiment 2, in focusing from an infinity in-focus condition to a close-object in-focus condition, the third lens unit G3 moves to the image side along the optical axis in any zooming condition.

Figure 9:
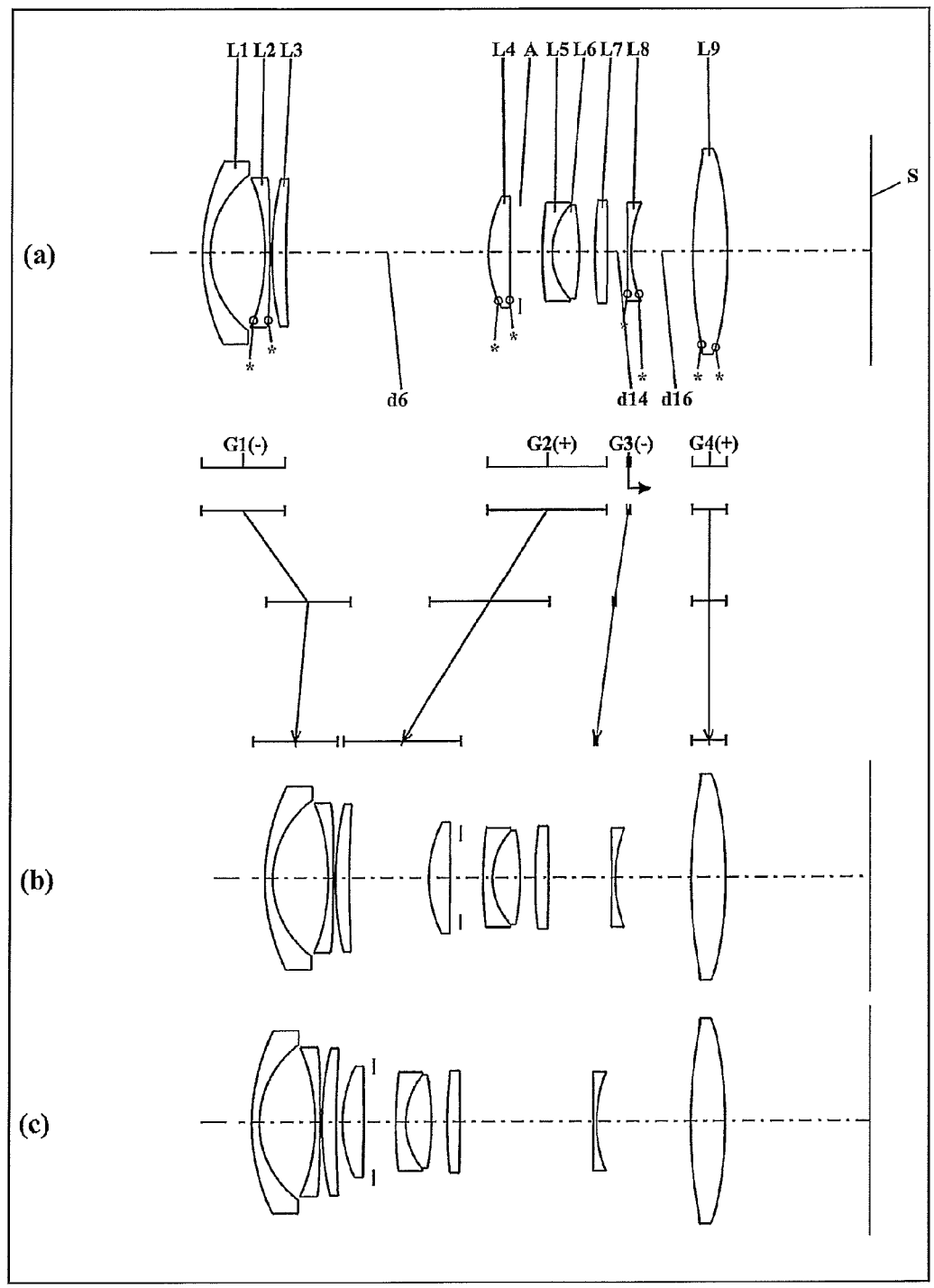
FIG. 9 is a lens arrangement diagram showing an infinity in-focus condition of a zoom lens system according to Embodiment 3 (Example 3)
Figure 10:
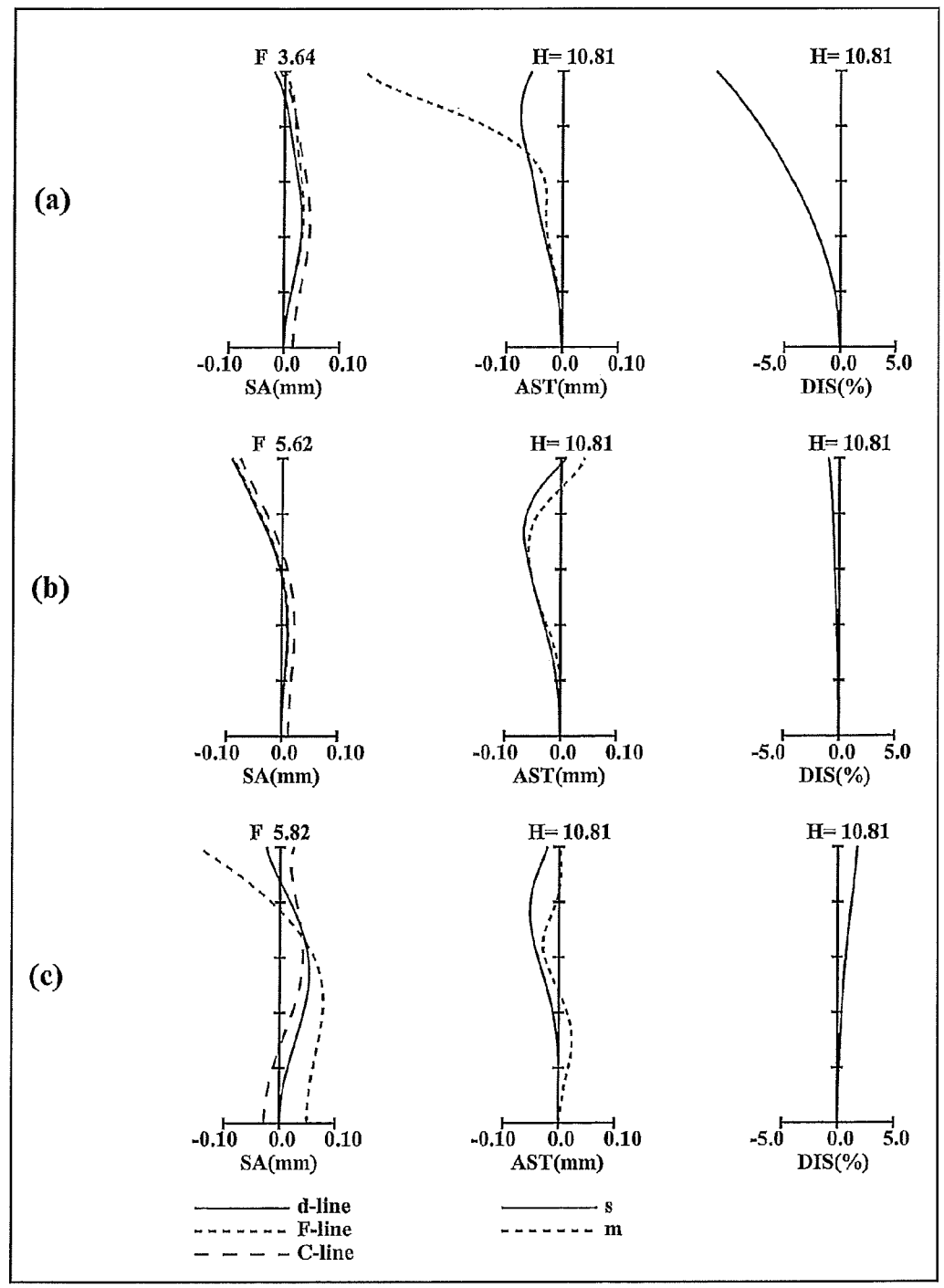
FIG. 10 is a longitudinal aberration diagram of an infinity in-focus condition of a zoom lens system according to Example 3.
Figure 11:
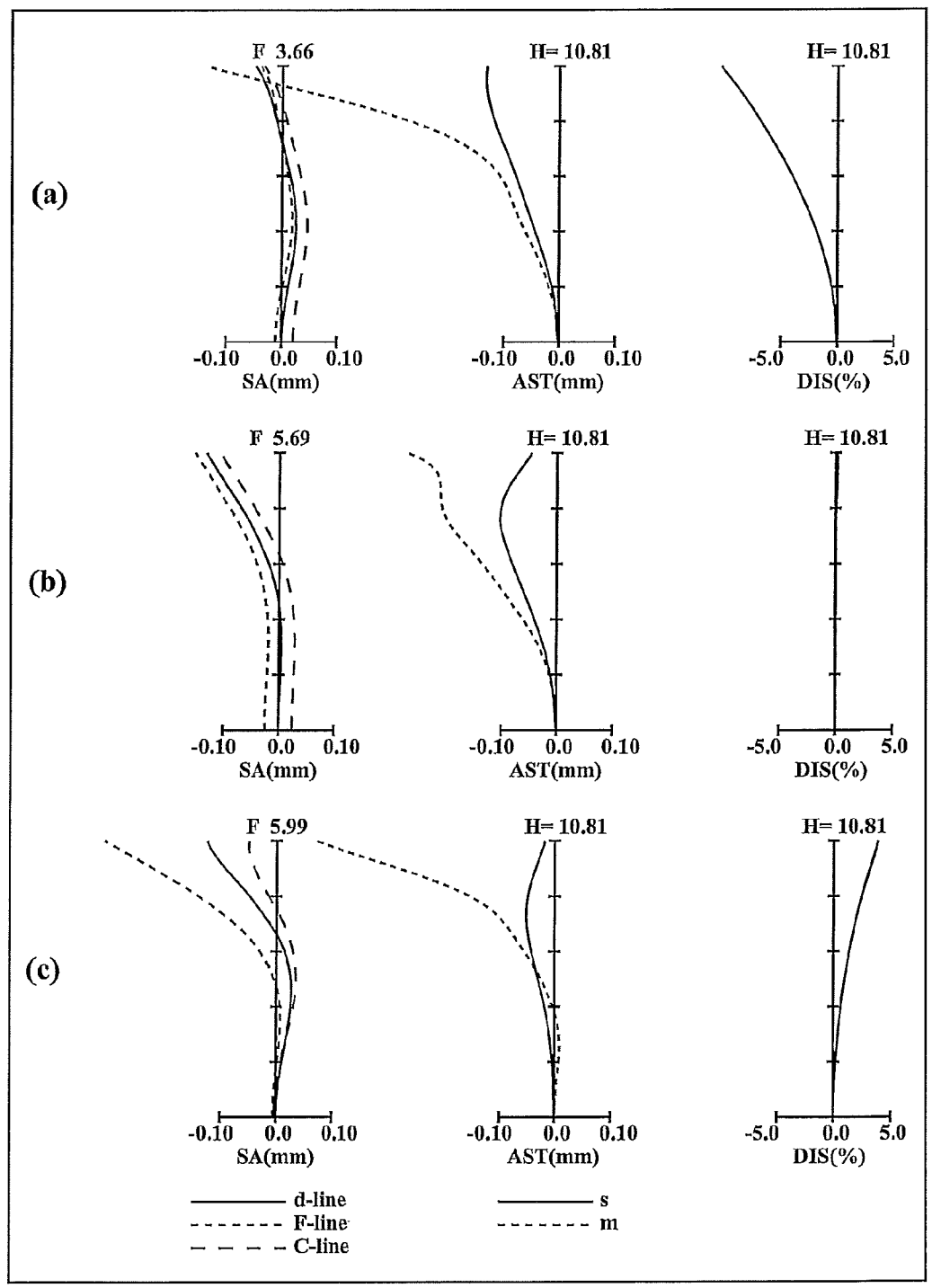
FIG. 11 is a longitudinal aberration diagram of a close-object in-focus condition of a zoom lens system according to Example 3.
Figure 12:
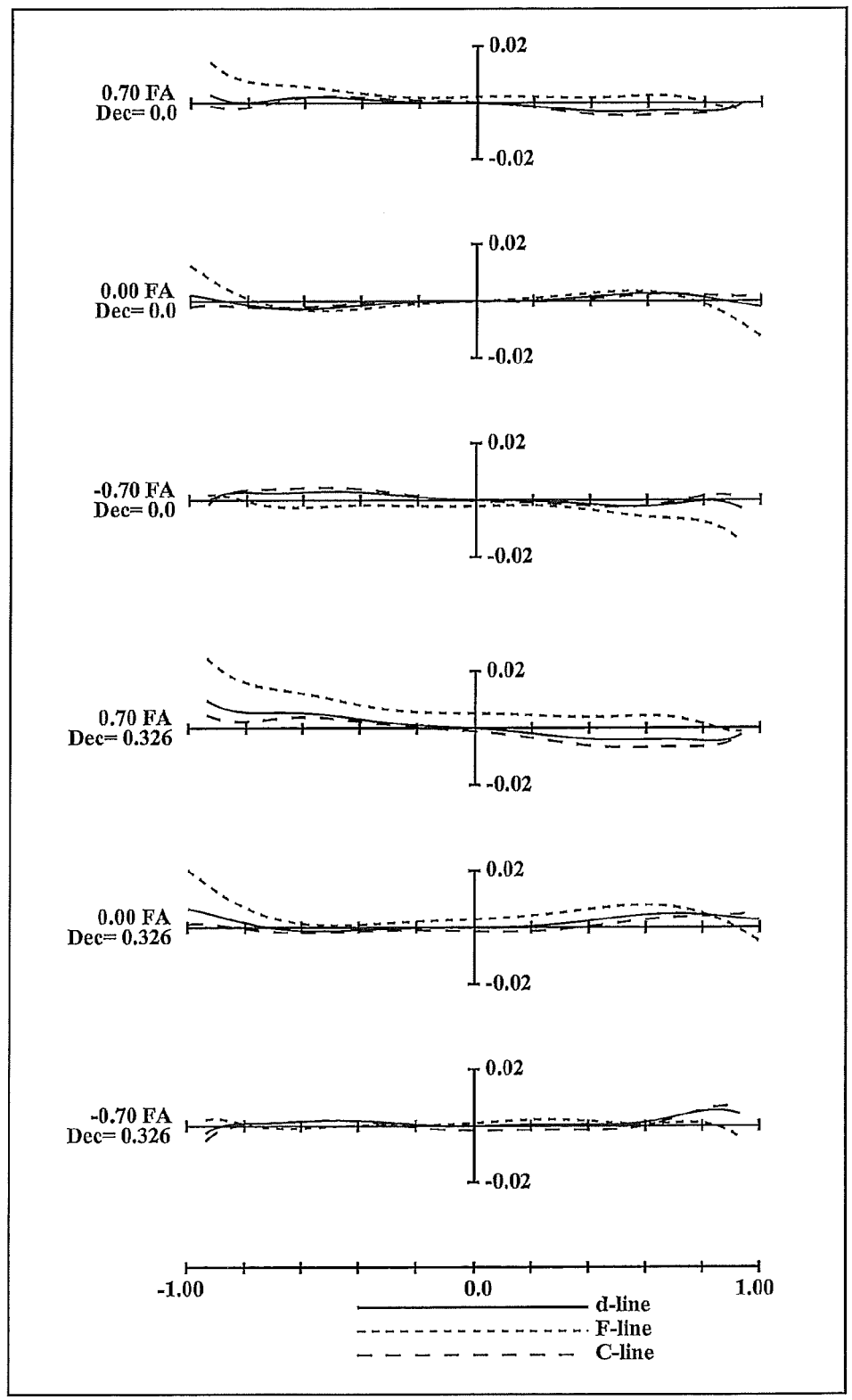
FIG. 12 is a lateral aberration diagram of a zoom lens system according to Example 3 at a telephoto limit in a basic state where image blur compensation is not performed and in an image blur compensation state.

As shown in FIG. 9, in the zoom lens system according to Embodiment 3, the first lens unit G1, in order from the object side to the image side, comprises: a negative meniscus first lens element L1 with the convex surface facing the object side; a negative meniscus second lens element L2 with the convex surface facing the image side; and a positive meniscus third lens element L3 with the convex surface facing the object side. Among these, the second lens element L2 has two aspheric surfaces.

In the zoom lens system according to Embodiment 3, the second lens unit G2, in order from the object side to the image side, comprises: a bi-convex fourth lens element L4; a negative meniscus fifth lens element L5 with the convex surface facing the object side; a bi-convex sixth lens element L6, and a bi-convex seventh lens element L7. Among these, the fifth lens element L5 and the sixth lens element L6 are cemented with each other. The fourth lens element L4 has two aspheric surfaces. Further, an aperture diaphragm A is provided between the fourth lens element L4 and the fifth lens element L5.

In the zoom lens system according to Embodiment 3, the third lens unit G3 comprises solely a bi-concave eighth lens element L8. The eighth lens element L8 has two aspheric surfaces.

In the zoom lens system according to Embodiment 3, the fourth lens unit G4 comprises solely a bi-convex ninth lens element L9. The ninth lens element L9 has two aspheric surfaces.

In the zoom lens system according to Embodiment 3, the seventh lens element L7 as a component of the second lens unit G2 corresponds to an image blur compensating lens unit described later, which moves in a direction perpendicular to the optical axis in order to optically compensate image blur.

In the zoom lens system according to Embodiment 3, in zooming from a wide-angle limit to a telephoto limit at the time of image taking, the first lens unit G1 moves with locus of a convex to the image side, the second lens unit G2 monotonically moves to the object side, the third lens unit G3 monotonically and slightly moves to the object side, and the fourth lens unit G4 is fixed relative to the image surface S. That is, in zooming, the first lens unit G1, the second lens unit G2, and the third lens unit G3 individually move along the optical axis such that the interval between the first lens unit G1 and the second lens unit G2 decreases, the interval between the second lens unit G2 and the third lens unit G3 increases, and the interval between the third lens unit G3 and the fourth lens unit G4 varies.

Further, in the zoom lens system according to Embodiment 3, in focusing from an infinity in-focus condition to a close-object in-focus condition, the third lens unit G3 moves to the image side along the optical axis in any zooming condition.

Figure 13:
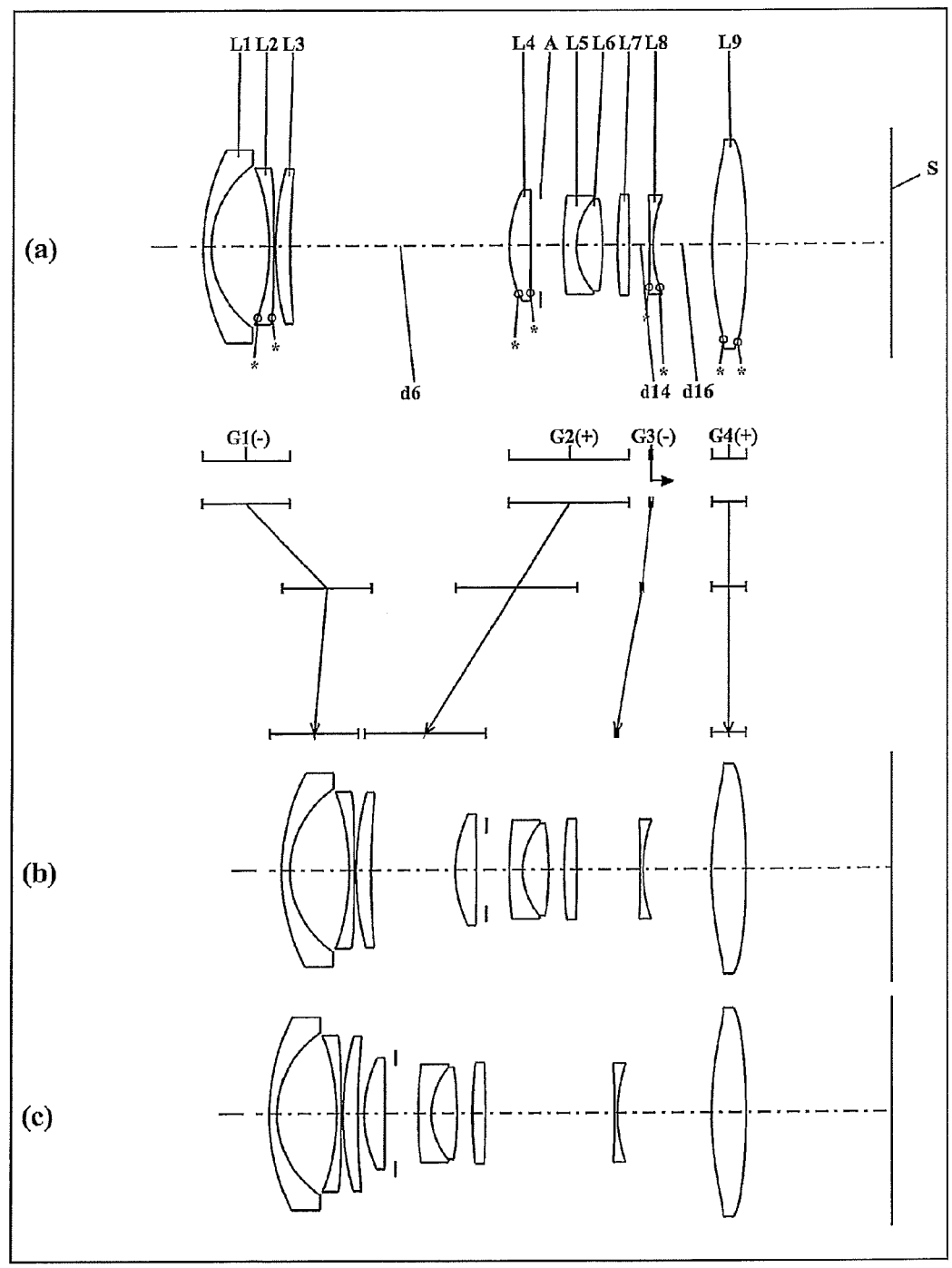
FIG. 13 is a lens arrangement diagram showing an infinity in-focus condition of a zoom lens system according to Embodiment 4 (Example 4)
Figure 14:
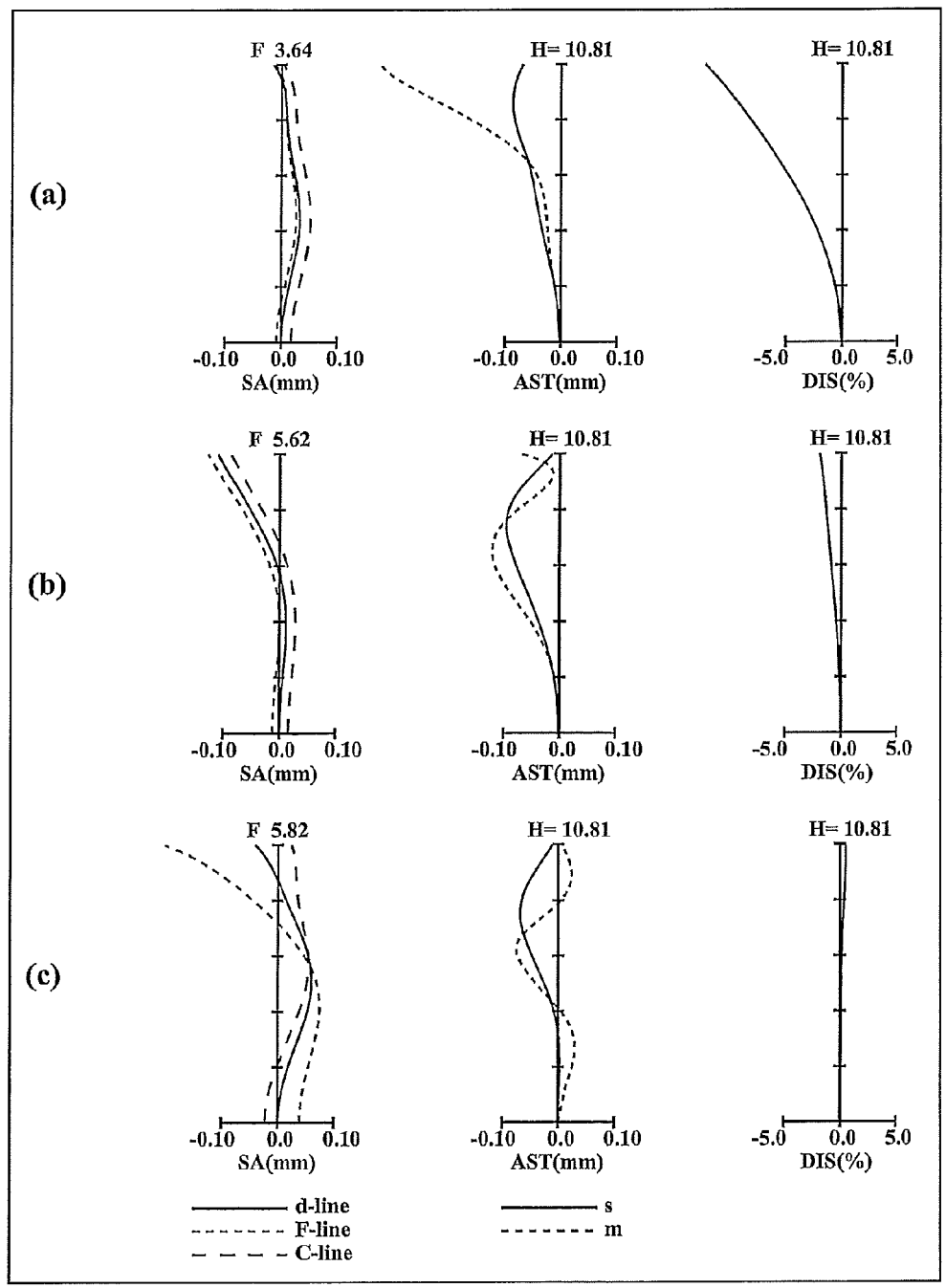
FIG. 14 is a longitudinal aberration diagram of an infinity in-focus condition of a zoom lens system according to Example 4.
Figure 15:
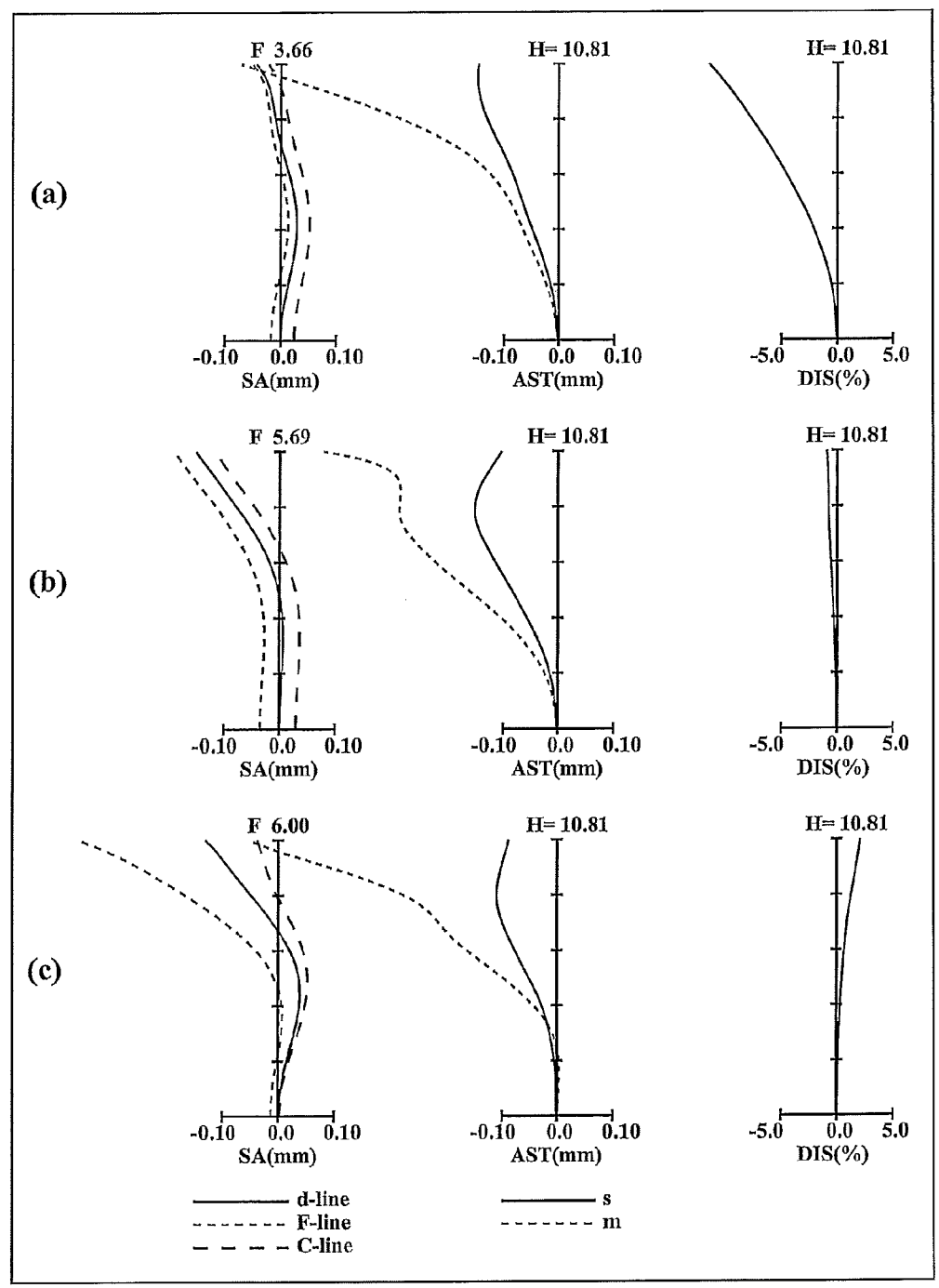
FIG. 15 is a longitudinal aberration diagram of a close-object in-focus condition of a zoom lens system according to Example 4.
Figure 16:
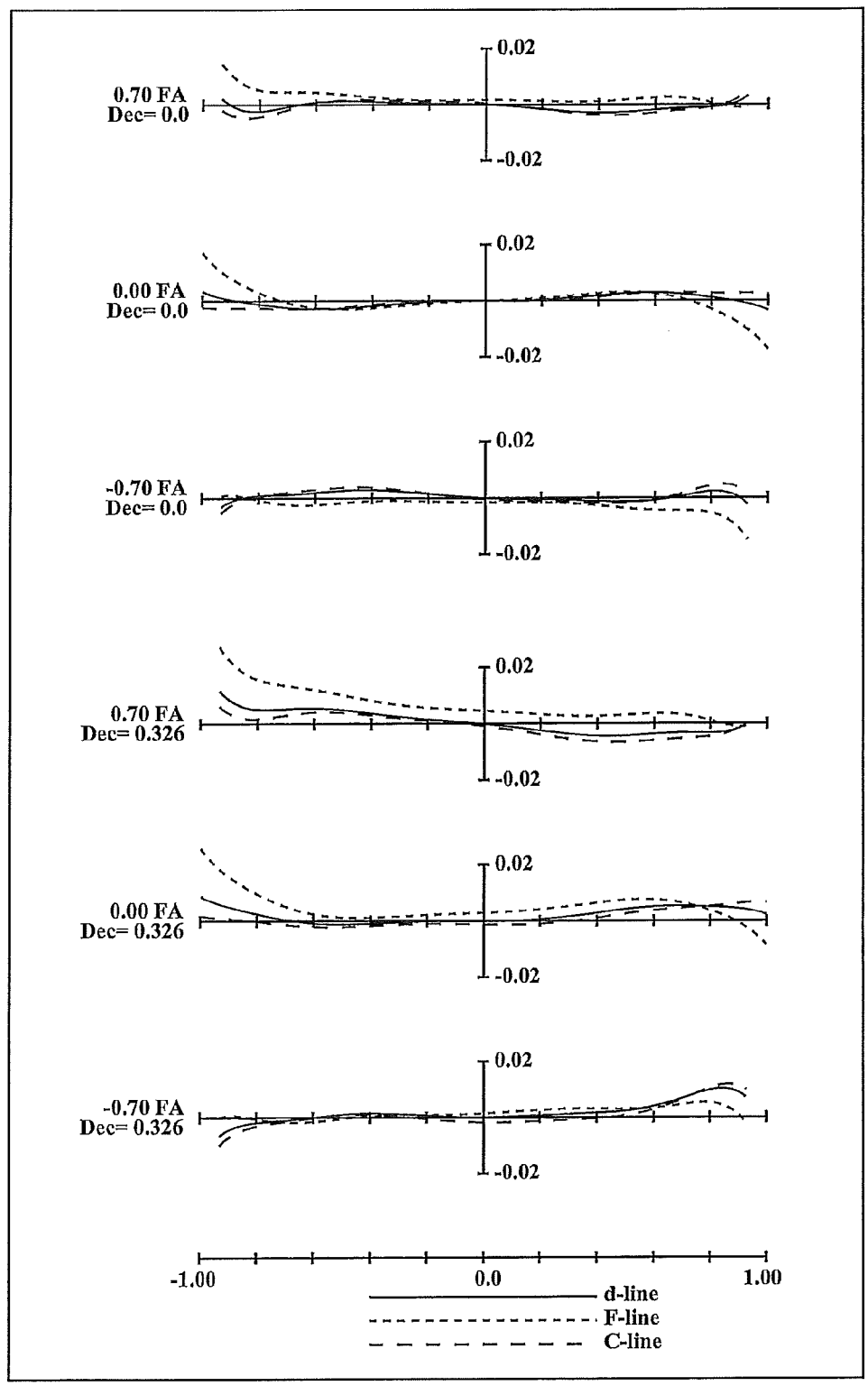
FIG. 16 is a lateral aberration diagram of a zoom lens system according to Example 4 at a telephoto limit in a basic state where image blur compensation is not performed and in an image blur compensation state.

As shown in FIG. 13, in the zoom lens system according to Embodiment 4, the first lens unit G1, in order from the object side to the image side, comprises: a negative meniscus first lens element L1 with the convex surface facing the object side; a negative meniscus second lens element L2 with the convex surface facing the image side; and a positive meniscus third lens element L3 with the convex surface facing the object side. Among these, the second lens element L2 has two aspheric surfaces.

In the zoom lens system according to Embodiment 4, the second lens unit G2, in order from the object side to the image side, comprises: a bi-convex fourth lens element L4; a negative meniscus fifth lens element L5 with the convex surface facing the object side; a bi-convex sixth lens element L6; and a bi-convex seventh lens element L7. Among these, the fifth lens element L5 and the sixth lens element L6 are cemented with each other. The fourth lens element L4 has two aspheric surfaces. Further, an aperture diaphragm A is provided between the fourth lens element L4 and the fifth lens element L5.

In the zoom lens system according to Embodiment 4, the third lens unit G3 comprises solely a bi-concave eighth lens element L8. The eighth lens element L8 has two aspheric surfaces.

In the zoom lens system according to Embodiment 4, the fourth lens unit G4 comprises solely a bi-convex ninth lens element L9. The ninth lens element L9 has two aspheric surfaces.

In the zoom lens system according to Embodiment 4, the seventh lens element L7 as a component of the second lens unit G2 corresponds to an image blur compensating lens unit described later, which moves in a direction perpendicular to the optical axis in order to optically compensate image blur.

In the zoom lens system according to Embodiment 4, in zooming from a wide-angle limit to a telephoto limit at the time of image taking, the first lens unit G1 moves with locus of a convex to the image side, the second lens unit G2 monotonically moves to the object side, the third lens unit G3 monotonically and slightly moves to the object side, and the fourth lens unit G4 is fixed relative to the image surface S. That is, in zooming, the first lens unit G1, the second lens unit G2, and the third lens unit G3 individually move along the optical axis such that the interval between the first lens unit G1 and the second lens unit G2 decreases, the interval between the second lens unit G2 and the third lens unit G3 increases, and the interval between the third lens unit G3 and the fourth lens unit G4 varies.

Further, in the zoom lens system according to Embodiment 4, in focusing from an infinity in-focus condition to a close-object in-focus condition, the third lens unit G3 moves to the image side along the optical axis in any zooming condition.

The zoom lens systems according to Embodiments 1 to 4 each have a four-unit construction of negative, positive, negative, and positive lens units. Since the first lens unit G1 located closest to the object side moves along the optical axis in zooming from a wide-angle limit to a telephoto limit at the time of image taking, the overall length of lens system is reduced, and moreover, the overall length of lens system with the lens barrel being retracted is also reduced. Since the fourth lens unit G4 located closest to the image side is fixed relative to the image surface in zooming, entry of dust or the like into the lens system is sufficiently prevented. Further, since the number of cam components is reduced, the configuration of the lens barrel can be simplified.

In the zoom lens systems according to Embodiments 1 to 4, in focusing from an infinity in-focus condition to a close-object in-focus condition, the third lens unit G3 moves along the optical axis, and the third lens unit G3 is sandwiched between the lens units having positive optical power, i.e., the second lens unit G2 and the fourth lens unit G4. Therefore, the negative optical power of the third lens unit G3 itself can be easily increased. Accordingly, the amount of movement of the third lens unit G3 can be reduced in focusing, and thus the overall length of lens system is reduced, and moreover, the overall length of lens system with the lens barrel being retracted is also reduced.

The zoom lens systems according to Embodiments 1 to 4 are each provided with an image blur compensating lens unit which moves in a direction perpendicular to the optical axis. The image blur compensating lens unit compensates image point movement caused by vibration of the entire system, that is, optically compensates image blur caused by hand blurring, vibration and the like.

When compensating image point movement caused by vibration of the entire system, the image blur compensating lens unit moves in the direction perpendicular to the optical axis, so that image blur is compensated in a state that size increase in the entire zoom lens system is suppressed to realize a compact construction and that excellent imaging characteristics such as small decentering coma aberration and small decentering astigmatism are satisfied.

The image blur compensating lens unit in the zoom lens system of the present invention may be a single lens unit. If a single lens unit is composed of a plurality of lens elements, the image blur compensating lens unit may be any one lens element or a plurality of adjacent lens elements among the plurality of lens elements.

The following description is given for conditions preferred to be satisfied by a zoom lens system like the zoom lens systems according to Embodiments 1 to 4. Here, a plurality of preferable conditions are set forth for the zoom lens system according to each embodiment. A construction that satisfies all the plurality of conditions is most desirable for the zoom lens system. However, when an individual condition is satisfied, a zoom lens system having the corresponding effect is obtained.

For example, in a zoom lens system like the zoom lens systems according to Embodiments 1 to 4, which comprises, in order from the object side to the image side, a first lens unit having negative optical power, a second lens unit having positive optical power, a third lens unit having negative optical power, and a fourth lens unit having positive optical power, in which the first lens unit moves along an optical axis, and the fourth lens unit is fixed relative to an image surface, in zooming from a wide-angle limit to a telephoto limit at the time of image taking (this lens configuration is referred to as a basic configuration of the embodiments, hereinafter), the following condition (1) is satisfied.

$$0.8 < |f_1/f_W| < 1.4 \quad (1)$$

where
$f_1$ is a composite focal length of the first lens unit, and
$f_W$ is a focal length of the entire system at a wide-angle limit.

The condition (1) sets forth the relationship between the focal length of the first lens unit, and the focal length of the entire system at a wide-angle limit. When the value goes below the lower limit of the condition (1), the amount of generated aberrations in the first lens unit at the time of decentering is increased. Conversely, when the value exceeds the upper limit of the condition (1), the overall length of lens system cannot be reduced.

When at least one of the following conditions (1)' and (1)" is satisfied, the above-mentioned effect is achieved more successfully.

$$1.00 < |f_1/f_W| \quad (1)'$$

$$|f_1/f_W| < 1.35 \quad (1)''$$

For example, a zoom lens system having the basic configuration like the zoom lens systems according to Embodiments 1 to 4 preferably satisfies the following condition (2).

$$0.30 < d_1/f_W < 0.85 \quad (2)$$

where
$d_1$ is an optical axial thickness of the first lens unit, and
$f_W$ is a focal length of the entire system at a wide-angle limit.

The condition (2) sets forth the relationship between the thickness of the first lens unit, and the focal length of the entire system at a wide-angle limit. When the value goes below the lower limit of the condition (2), the optical power of each lens element as a component of the first lens unit cannot be increased, which makes it difficult to reduce the overall length of lens system. Conversely, when the value exceeds the upper limit of the condition (2), the overall length of lens system increases, and the overall length of lens system with the lens barrel being retracted might increase.

When at least one of the following conditions (2)' and (2)" is satisfied, the above-mentioned effect is achieved more successfully.

$$0.4 < d_1/f_W \quad (2)'$$

$$d_1/f_W < 0.7 \quad (2)''$$

For example, a zoom lens system having the basic configuration like the zoom lens systems according to Embodiments 1 to 4 preferably satisfies the following condition (3).

$$0.7 < f_2/f_W < 1.2 \quad (3)$$

where
$f_2$ is a composite focal length of the second lens unit, and
$f_W$ is a focal length of the entire system at a wide-angle limit.

The condition (3) sets forth the relationship between the focal length of the second lens unit, and the focal length of the entire system at a wide-angle limit. When the value goes below the lower limit of the condition (3), the amount of generated aberrations in the second lens unit at the time of decentering might be increased. Conversely, when the value exceeds the upper limit of the condition (3), the amount of movement of the second lens unit in zooming is increased, and the overall length of lens system might be increased.

When at least one of the following conditions (3)' and (3)" is satisfied, the above-mentioned effect is achieved more successfully.

$$0.8 < f_2/f_W \quad (3)'$$

$$f_2/f_W < 1.1 \quad (3)''$$

The individual lens units constituting the zoom lens systems according to Embodiments 1 to 4 are each composed exclusively of refractive type lens elements that deflect incident light by refraction (that is, lens elements of a type in which deflection is achieved at the interface between media having different refractive indices). However, the present invention is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is preferable.

(Embodiment 5)

Figure 17:
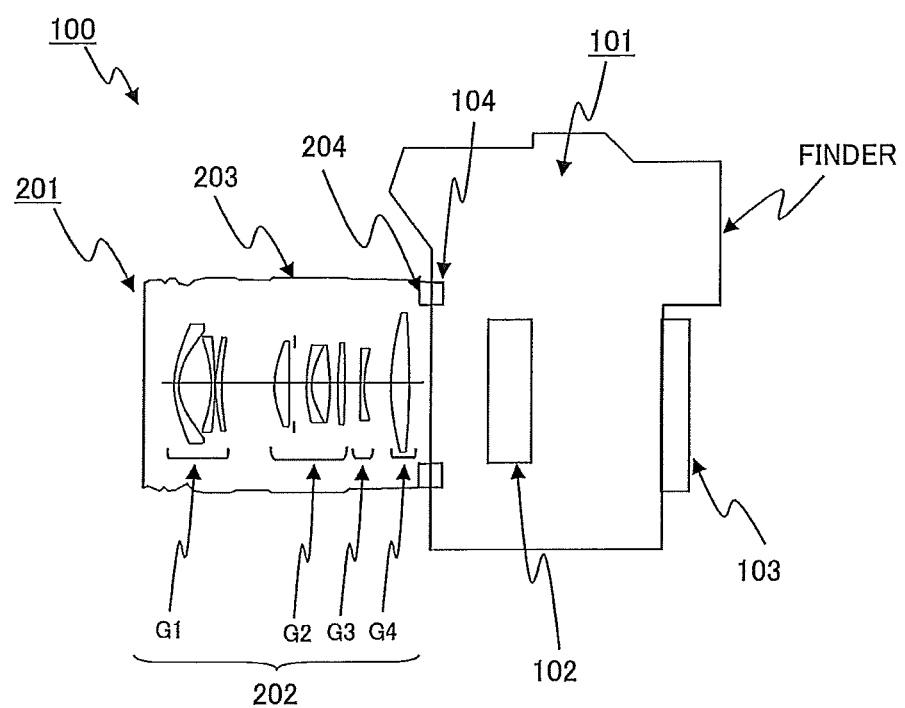
FIG. 17 is a schematic construction diagram of an interchangeable-lens type digital camera system according to Embodiment 5.

FIG. 17 is a schematic construction diagram of an interchangeable-lens type digital camera system according to Embodiment 5.

The interchangeable-lens type digital camera system 100 according to Embodiment 5 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 4; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 17, the zoom lens system according to Embodiment 1 is employed as the zoom lens system 202.

In Embodiment 5, since the zoom lens system 202 according to any of Embodiments 1 to 4 is employed, a compact interchangeable lens apparatus having excellent imaging performance can be realized at low cost. Moreover, size reduction and cost reduction of the entire camera system 100 according to Embodiment 5 can be achieved. In the zoom lens systems according to Embodiments 1 to 4, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 4.

Numerical examples are described below in which the zoom lens systems according to Embodiments 1 to 4 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 6, 10, and 14 are longitudinal aberration diagrams of an infinity in-focus condition of the zoom lens systems according to Numerical Examples 1 to 4, respectively.

FIGS. 3, 7, 11, and 15 are longitudinal aberration diagrams of a close-object in-focus condition of the zoom lens systems according to Numerical Examples 1 to 4, respectively. The object distance in each of Numerical Examples 1 to 4 is 300 mm.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each FIG., indicated as F), and the solid line, the short dash line and the long dash line indicate the characteristics to the d-line, the F-line and the C-line, respectively. In each astigmatism diagram, the vertical axis indicates the image height (in each FIG., indicated as H), and the solid line and the dash line indicate the characteristics to the sagittal plane (in each FIG., indicated as "s") and the meridional plane (in each FIG., indicated as "m"), respectively. In each distortion diagram, the vertical axis indicates the image height (in each FIG., indicated as H).

FIGS. 4, 8, 12, and 16 are lateral aberration diagrams of the zoom lens systems at a telephoto limit according to Numerical Examples 1 to 4, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit (the seventh lens element L7) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the second lens unit G2.

Here, in the zoom lens system according to each numerical example, the amount of movement of the image blur compensating lens unit in a direction perpendicular to the optical axis in an image blur compensation state at a telephoto limit is as follows.

Numerical Example 1 0.197 mm
Numerical Example 2 0.309 mm
Numerical Example 3 0.326 mm
Numerical Example 4 0.326 mm Here, when the shooting distance is infinity, at a telephoto limit, the amount of image decentering in a case that the zoom lens system inclines by 0.3° is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

NUMERICAL EXAMPLE 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data in an infinity in-focus condition. Table 4 shows various data in a close-object in-focus condition.

TABLE 1

(Surface data)

| Surface number | r | d | nd | vd |
|---|---|---|---|---|
| Object surface | ∞ | | | |
| 1 | 16.40380 | 0.80000 | 1.85400 | 40.4 |
| 2* | 8.70510 | 5.36700 | | |
| 3* | −16.23400 | 0.50000 | 1.58700 | 59.6 |
| 4* | −1000.00000 | 0.20000 | | |
| 5 | 22.10010 | 1.22670 | 1.94595 | 18.0 |
| 6 | 40.70380 | Variable | | |
| 7* | 11.89400 | 2.01860 | 1.77200 | 50.0 |
| 8* | −1000.00000 | 1.00000 | | |
| 9(Diaphragm) | ∞ | 2.00000 | | |
| 10 | 25.27820 | 0.60360 | 1.90366 | 31.3 |
| 11 | 7.33550 | 2.74960 | 1.49700 | 81.6 |
| 12 | −33.30680 | 1.50000 | | |
| 13 | 33.70860 | 1.20000 | 1.58144 | 40.9 |
| 14 | −92.62430 | Variable | | |
| 15* | 89.01870 | 0.40000 | 1.77200 | 50.0 |
| 16* | 10.65000 | Variable | | |
| 17* | 43.13480 | 3.20140 | 1.77200 | 50.0 |
| 18* | −62.42310 | (BF) | | |
| Image surface | ∞ | | | |

TABLE 2

(Aspherical data)

Surface No. 2

K = 0.00000E+00, A4 = −2.93817E−05, A6 = −3.76091E−07, A8 = 0.00000E+00 A10 = 0.00000E+00
Surface No. 3

K = 0.00000E+00, A4 = 1.02745E−04, A6 = −2.96307E−06, A8 = 7.20352E−08 A10 = −6.88162E−10
Surface No. 4

K = 0.00000E+00, A4 = 8.27369E−05, A6 = −2.92460E−06, A8 = 6.16726E−08 A10 = −6.12881E−10
Surface No. 7

K = 0.00000E+00, A4 = −4.56841E−05, A6 = 7.79393E−08, A8 = −5.36872E−09 A10 = −1.13968E−09
Surface No. 8

K = 0.00000E+00, A4 = 4.14571E−05, A6 = −3.06241E−08, A8 = −1.39984E−08 A10 = −1.02011E−09
Surface No. 15

K = 0.00000E+00, A4 = 1.00000E−04, A6 = −1.13790E−05, A8 = 3.01367E−07 A10 = −3.11212E−09
Surface No. 16

K = 0.00000E+00, A4 = 1.20867E−04, A6 = −1.18142E−05, A8 = 2.17820E−07 A10 = −1.42329E−09
Surface No. 17

K = 0.00000E+00, A4 = 7.69393E−05, A6 = −9.88168E−07, A8 = 1.17069E−08 A10 = −8.74673E−11
Surface No. 18

K = 0.00000E+00, A4 = 5.55736E−05, A6 = −1.09755E−06, A8 = 1.39235E−08 A10 = −9.84665E−11

TABLE 3

(Various data in an infinity in-focus condition)

Zooming ratio 2.79711

| | Wide-angle limit | Middle position | Telephoto limit |
|---|---|---|---|
| Focal length | 14.4902 | 24.2337 | 40.5305 |
| F-number | 3.64008 | 5.30432 | 5.82465 |
| View angle | 40.7383 | 24.2803 | 14.8040 |
| Image height | 10.8150 | 10.8150 | 10.8150 |
| Overall length of lens system | 62.5692 | 57.4360 | 60.2629 |
| BF | 14.1990 | 14.1990 | 14.1990 |
| d6 | 17.0276 | 6.6607 | 0.6000 |
| d14 | 2.0929 | 6.5640 | 13.4281 |
| d16 | 6.4825 | 7.2449 | 9.2689 |

Zoom lens unit data

| Lens unit | Initial surface No. | Focal length |
|---|---|---|
| 1 | 1 | −15.91283 |
| 2 | 7 | 13.59799 |
| 3 | 15 | −15.70505 |
| 4 | 17 | 33.48446 |

TABLE 4

(Various data in a close-object in-focus condition)

| | Wide-angle limit | Middle position | Telephoto limit |
|---|---|---|---|
| Object distance | 300.0000 | 300.0000 | 300.0000 |
| BF | 14.1990 | 14.1990 | 14.1990 |
| d6 | 17.0276 | 6.6607 | 0.6000 |
| d14 | 2.3341 | 7.2309 | 15.2027 |
| d16 | 6.2412 | 6.5781 | 7.4943 |

NUMERICAL EXAMPLE 2

The zoom lens system of Numerical Example 2 corresponds to Embodiment 2 shown in FIG. 5. Table 5 shows the surface data of the zoom lens system of Numerical Example 2. Table 6 shows the aspherical data. Table 7 shows various data in an infinity in-focus condition. Table 8 shows various data in a close-object in-focus condition.

TABLE 5

(Surface data)

| Surface number | r | d | nd | vd |
|---|---|---|---|---|
| Object surface | ∞ | | | |
| 1* | 20.97060 | 0.80000 | 1.88202 | 37.2 |
| 2* | 10.34980 | 5.43880 | | |
| 3 | −14.58890 | 0.50000 | 1.59282 | 68.6 |
| 4 | −1000.00000 | 0.20000 | | |
| 5* | 19.27220 | 1.04380 | 2.10205 | 16.8 |
| 6* | 28.86040 | Variable | | |
| 7* | 12.33480 | 2.00670 | 1.77200 | 50.0 |
| 8* | −204.79110 | 1.00000 | | |
| 9(Diaphragm) | ∞ | 2.00000 | | |
| 10 | 22.81520 | 0.40000 | 1.90366 | 31.3 |
| 11 | 7.46930 | 3.42290 | 1.49700 | 81.6 |
| 12 | −21.65080 | 1.64200 | | |
| 13 | 41.23190 | 1.20000 | 1.56732 | 42.8 |
| 14 | −628.00810 | Variable | | |
| 15* | −1000.00000 | 0.40000 | 1.77200 | 50.0 |
| 16* | 11.60870 | Variable | | |

TABLE 5-continued (Surface data)

| Surface number | r | d | nd | vd |
|---|---|---|---|---|
| 17* | 49.49080 | 3.21540 | 1.77200 | 50.0 |
| 18* | −48.60270 | (BF) | | |
| Image surface | ∞ | | | |

TABLE 6

(Aspherical data)

Surface No. 1

K = 0.00000E+00, A4 = 0.00000E+00, A6 = 4.49146E−06,
A8 = −5.78548E−08 A10 = 3.29283E−10
Surface No. 2

K = 0.00000E+00, A4 = −4.40117E−05, A6 = 5.55705E−06,
A8 = −2.86645E−08 A10 = 1.41009E−10
Surface No. 5

K = 0.00000E+00, A4 = −1.00000E−04, A6 = −1.84082E−06,
A8 = 7.28946E−08 A10 = −1.92707E−09
Surface No. 6

K = 0.00000E+00, A4 = −7.07949E−05, A6 = −1.93960E−06,
A8 = 5.86689E−08 A10 = −1.61052E−09
Surface No. 7

K = 0.00000E+00, A4 = −3.58808E−05, A6 = 7.28129E−07,
A8 = −4.84330E−08 A10 = 5.96570E−10
Surface No. 8

K = 0.00000E+00, A4 = 6.28061E−05, A6 = 4.75342E−07,
A8 = −4.77253E−08 A10 = 6.26358E−10
Surface No. 15

K = 0.00000E+00, A4 = 0.00000E+00, A6 = 1.09067E−05,
A8 = −9.35642E−07 A10 = 2.15638E−08
Surface No. 16

K = 0.00000E+00, A4 = 1.59365E−05, A6 = 1.08746E−05,
A8 = −9.68109E−07 A10 = 2.12985E−08
Surface No. 17

K = 0.00000E+00, A4 = −3.90197E−06, A6 = 5.69879E−07,
A8 = −2.60874E−09 A10 = −3.41674E−11
Surface No. 18

K = 0.00000E+00, A4 = −2.34267E−05, A6 = 2.11276E−07,
A8 = 3.97936E−09 A10 = −6.65429E−11

TABLE 7

(Various data in an infinity in-focus condition)

Zooming ratio 2.79706

| | Wide-angle limit | Middle position | Telephoto limit |
|---|---|---|---|
| Focal length | 14.4902 | 24.2342 | 40.5300 |
| F-number | 3.64036 | 5.30465 | 5.82411 |
| View angle | 40.6173 | 24.4637 | 14.7891 |
| Image height | 10.8150 | 10.8150 | 10.8150 |
| Overall length of lens system | 61.2693 | 57.4949 | 60.1514 |
| BF | 14.1990 | 14.1990 | 14.1990 |
| d6 | 15.8506 | 6.4043 | 0.6000 |
| d14 | 1.6000 | 5.8476 | 12.8283 |
| d16 | 6.3496 | 7.7541 | 9.2548 |

TABLE 7-continued (Various data in an infinity in-focus condition)

Zoom lens unit data

| Lens unit | Initial surface No. | Focal length |
|---|---|---|
| 1 | 1 | −15.03365 |
| 2 | 7 | 13.07205 |
| 3 | 15 | −14.86211 |
| 4 | 17 | 32.22372 |

TABLE 8

(Various data in a close-object in-focus condition)

| | Wide-angle limit | Middle position | Telephoto limit |
|---|---|---|---|
| Object distance | 300.0000 | 300.0000 | 300.0000 |
| BF | 14.1990 | 14.1990 | 14.1990 |
| d6 | 15.8506 | 6.4043 | 0.6000 |
| d14 | 1.8281 | 6.4599 | 14.4939 |
| d16 | 6.1214 | 7.1618 | 7.5892 |

NUMERICAL EXAMPLE 3

The zoom lens system of Numerical Example 3 corresponds to Embodiment 3 shown in FIG. 9. Table 9 shows the surface data of the zoom lens system of Numerical Example 3. Table 10 shows the aspherical data. Table 11 shows various data in an infinity in-focus condition. Table 12 shows various data in a close-object in-focus condition.

TABLE 9

(Surface data)

| Surface number | r | d | nd | vd |
|---|---|---|---|---|
| Object surface | ∞ | | | |
| 1 | 20.60510 | 0.75000 | 1.91082 | 35.2 |
| 2 | 9.64040 | 5.40810 | | |
| 3* | −20.79120 | 0.45000 | 1.58700 | 59.6 |
| 4* | −1000.00000 | 0.20000 | | |
| 5 | 31.43100 | 1.38140 | 1.94595 | 18.0 |
| 6 | 114.83670 | Variable | | |
| 7* | 12.26100 | 2.08480 | 1.77200 | 50.0 |
| 8* | −169.22360 | 1.00000 | | |
| 9(Diaphragm) | ∞ | 2.17030 | | |
| 10 | 42.56360 | 0.93430 | 1.80610 | 33.3 |
| 11 | 7.05690 | 2.63900 | 1.49700 | 81.6 |
| 12 | −26.91200 | 1.50000 | | |
| 13 | 44.09870 | 1.24800 | 1.53172 | 48.8 |
| 14 | −221.46260 | Variable | | |
| 15* | −176.45890 | 0.30000 | 1.81000 | 41.0 |
| 16* | 13.24750 | Variable | | |
| 17* | 46.56780 | 3.36260 | 1.81000 | 41.0 |
| 18* | −48.08340 | (BF) | | |
| Image surface | ∞ | | | |

TABLE 10

(Aspherical data)

Surface No. 3

K = 0.00000E+00, A4 = 7.78291E−05, A6 = −3.38646E−06,
A8 = 4.55802E−08 A10 = −3.51518E−10

TABLE 10-continued (Aspherical data)

Surface No. 4

K = 0.00000E+00, A4 = 3.22844E−05, A6 = −3.38302E−06,
A8 = 4.32082E−08 A10 = −3.04902E−10
Surface No. 7

K = 0.00000E+00, A4 = −3.90952E−05, A6 = 1.24439E−06,
A8 = −5.28256E−08 A10 = 7.33511E−10
Surface No. 8

K = 0.00000E+00, A4 = 4.15736E−05, A6 = 1.04515E−06,
A8 = −5.13579E−08 A10 = 7.66552E−10
Surface No. 15

K = 0.00000E+00, A4 = 1.00000E−04, A6 = −6.78629E−06,
A8 = 1.21372E−07 A10 = 1.39852E−10
Surface No. 16

K = 0.00000E+00, A4 = 1.23134E−04, A6 = −6.69164E−06,
A8 = 9.18276E−08 A10 = 1.44103E−10
Surface No. 17

K = 0.00000E+00, A4 = −2.10511E−05, A6 = 4.47712E−07,
A8 = −8.11996E−10 A10 = −3.09462E−11
Surface No. 18

K = 0.00000E+00, A4 = −3.28057E−05, A6 = 1.25071E−07,
A8 = 4.40036E−09 A10 = −5.42982E−11

TABLE 11

(Various data in an infinity in-focus condition)

Zooming ratio 2.79713

| | Wide-angle limit | Middle position | Telephoto limit |
|---|---|---|---|
| Focal length | 14.4900 | 24.2339 | 40.5303 |
| F-number | 3.64035 | 5.61714 | 5.82436 |
| View angle | 40.0343 | 24.2556 | 14.6951 |
| Image height | 10.8150 | 10.8150 | 10.8150 |
| Overall length of lens system | 65.5690 | 59.1454 | 60.3591 |
| BF | 14.1990 | 14.1990 | 14.1990 |
| d6 | 19.8657 | 7.8824 | 0.6000 |
| d14 | 2.0487 | 6.2078 | 12.9237 |
| d16 | 6.0271 | 7.4275 | 9.2073 |

Zoom lens unit data

| Lens unit | Initial surface No. | Focal length |
|---|---|---|
| 1 | 1 | −18.11298 |
| 2 | 7 | 14.50640 |
| 3 | 15 | −15.20214 |
| 4 | 17 | 29.67778 |

TABLE 12

(Various data in a close-object in-focus condition)

| | Wide-angle limit | Middle position | Telephoto limit |
|---|---|---|---|
| Object distance | 300.0000 | 300.0000 | 300.0000 |
| BF | 14.1990 | 14.1990 | 14.1990 |
| d6 | 19.8657 | 7.8824 | 0.6000 |
| d14 | 2.3019 | 6.8924 | 14.7787 |
| d16 | 5.7739 | 6.7429 | 7.3524 |

NUMERICAL EXAMPLE 4

The zoom lens system of Numerical Example 4 corresponds to Embodiment 4 shown in FIG. 13. Table 13 shows the surface data of the zoom lens system of Numerical Example 4. Table 14 shows the aspherical data. Table 15 shows various data in an infinity in-focus condition. Table 16 shows various data in a close-object in-focus condition.

TABLE 13

(Surface data)

| Surface number | r | d | nd | vd |
|---|---|---|---|---|
| Object surface | ∞ | | | |
| 1 | 21.15720 | 0.80000 | 1.91082 | 35.2 |
| 2 | 9.83280 | 5.75510 | | |
| 3* | −23.59190 | 0.45000 | 1.58700 | 59.6 |
| 4* | −1000.00000 | 0.20000 | | |
| 5 | 29.71680 | 1.44360 | 1.94595 | 18.0 |
| 6 | 85.15320 | Variable | | |
| 7* | 12.42250 | 2.05680 | 1.77200 | 50.0 |
| 8* | −228.24320 | 1.00000 | | |
| 9(Diaphragm) | ∞ | 2.23000 | | |
| 10 | 39.71530 | 1.28130 | 1.80610 | 33.3 |
| 11 | 6.95180 | 2.56550 | 1.49700 | 81.6 |
| 12 | −30.47070 | 1.50000 | | |
| 13 | 47.04490 | 1.24690 | 1.53172 | 48.8 |
| 14 | −153.28640 | Variable | | |
| 15* | −90.57310 | 0.30000 | 1.81000 | 41.0 |
| 16* | 14.26640 | Variable | | |
| 17* | 32.76550 | 3.38250 | 1.81000 | 41.0 |
| 18* | −83.37160 | (BF) | | |
| Image surface | ∞ | | | |

TABLE 14

(Aspherical data)

Surface No. 3

K = 0.00000E+00, A4 = 7.32553E−05, A6 = −2.96916E−06,
A8 = 4.30005E−08 A10 = −3.53159E−10, A12 = 0.00000E+00,
A14 = 0.00000E+00
Surface No. 4

K = 0.00000E+00, A4 = 3.22844E−05, A6 = −2.91391E−06,
A8 = 3.77275E−08 A10 = −2.93792E−10, A12 = 0.00000E+00,
A14 = 0.00000E+00
Surface No. 7

K = 0.00000E+00, A4 = −3.66178E−05, A6 = 1.19556E−06,
A8 = −5.26568E−08 A10 = 6.82463E−10, A12 = 0.00000E+00,
A14 = 0.00000E+00
Surface No. 8

K = 0.00000E+00, A4 = 3.52145E−05, A6 = 9.19306E−07,
A8 = −4.75489E−08 A10 = 6.62628E−10, A12 = 0.00000E+00,
A14 = 0.00000E+00
Surface No. 15

K = 0.00000E+00, A4 = 1.00000E−04, A6 = −7.26102E−06,
A8 = 1.52788E−07 A10 = 4.07714E−10, A12 = 0.00000E+00,
A14 = 0.00000E+00
Surface No. 16

K = 0.00000E+00, A4 = 1.01829E−04, A6 = −6.25821E−06,
A8 = 8.90426E−08 A10 = 8.25375E−10, A12 = 0.00000E+00,
A14 = 0.00000E+00
Surface No. 17

K = 0.00000E+00, A4 = −5.80273E−05, A6 = 1.02178E−06,
A8 = −1.20401E−08 A10 = 1.38220E−10, A12 = −1.43190E−12,
A14 = 4.64590E−15

TABLE 14-continued (Aspherical data)

Surface No. 18

K = 0.00000E+00, A4 = −6.26700E−05, A6 = 5.15668E−07,
A8 = −2.52254E−09 A10 = 6.78134E−11, A12 = −1.19011E−12,
A14 = 4.17696E−15

TABLE 15

(Various data in an infinity in-focus condition)

Zooming ratio 2.79713

| | Wide-angle limit | Middle position | Telephoto limit |
|---|---|---|---|
| Focal length | 14.4900 | 24.2340 | 40.5305 |
| F-number | 3.64026 | 5.61666 | 5.82410 |
| View angle | 40.3510 | 24.4581 | 14.8742 |
| Image height | 10.8150 | 10.8150 | 10.8150 |
| Overall length of lens system | 67.5692 | 59.5906 | 60.8192 |
| BF | 14.1990 | 14.1990 | 14.1990 |
| d6 | 21.4345 | 8.2733 | 0.6000 |
| d14 | 2.0157 | 6.2285 | 12.6194 |
| d16 | 5.7087 | 6.6780 | 9.1882 |

Zoom lens unit data

| Lens unit | Initial surface No. | Focal length |
|---|---|---|
| 1 | 1 | −19.26575 |
| 2 | 7 | 14.96989 |
| 3 | 15 | −15.19671 |
| 4 | 17 | 29.42241 |

TABLE 16

(Various data in a close-object in-focus condition)

| | Wide-angle limit | Middle position | Telephoto limit |
|---|---|---|---|
| Object distance | 300.0000 | 300.0000 | 300.0000 |
| BF | 14.1990 | 14.1990 | 14.1990 |
| d6 | 21.4345 | 8.2733 | 0.6000 |
| d14 | 2.2737 | 6.9400 | 14.4985 |
| d16 | 5.4507 | 5.9665 | 7.3091 |

The following Table 17 shows the corresponding values to the individual conditions in the zoom lens systems of each of Numerical Examples.

TABLE 17

(Values corresponding to conditions)

| | Numerical Example | | | |
|---|---|---|---|---|
| Condition | 1 | 2 | 3 | 4 |
| (1) $|f_1/f_W|$ | 1.10 | 1.04 | 1.25 | 1.33 |
| (2) $d_1/f_W$ | 0.56 | 0.55 | 0.57 | 0.60 |
| (3) $f_2/f_W$ | 0.94 | 0.90 | 1.00 | 1.03 |

The zoom lens system according to the present invention is applicable to a digital still camera, a digital video camera, a camera for a mobile telephone, a camera for a PDA (Personal Digital Assistance), a surveillance camera in a surveillance system, a Web camera, a vehicle-mounted camera or the like.

In particular, the zoom lens system according to the present invention is suitable for a photographing optical system where high image quality is required like in a digital still camera system or a digital video camera system.

Also, the zoom lens system according to the present invention is applicable to, among the interchangeable lens apparatuses according to the present invention, an interchangeable lens apparatus having motorized zoom function, i.e., activating function for the zoom lens system by a motor, with which a digital video camera system is provided.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system, in order from an object side to an image side, comprising a first lens unit having negative optical power, a second lens unit having positive optical power, a third lens unit having negative optical power, and a fourth lens unit having positive optical power, wherein
the first lens unit moves along an optical axis, and the fourth lens unit does not move along the optical axis and is fixed relative to an image surface, in zooming from a wide-angle limit to a telephoto limit at the time of image taking, and
the following condition (1) is satisfied:

$$0.8 < |f_1/f_W| < 1.4 \quad (1)$$

where
$f_1$ is a composite focal length of the first lens unit, and
$f_W$ is a focal length of the entire system at a wide-angle limit.

2. The zoom lens system as claimed in claim 1, wherein the following condition (2) is satisfied:

$$0.30 < d_1/f_W < 0.85 \quad (2)$$

where
$d_1$ is an optical axial thickness of the first lens unit, and
$f_W$ is a focal length of the entire system at a wide-angle limit.

3. The zoom lens system as claimed in claim 1, wherein the following condition (3) is satisfied:

$$0.7 < f_2/f_W < 1.2 \quad (3)$$

where
$f_2$ is a composite focal length of the second lens unit, and
$f_W$ is a focal length of the entire system at a wide-angle limit.

4. The zoom lens system as claimed in claim 1, wherein the third lens unit moves along the optical axis in focusing from an infinity in-focus condition to a close-object in-focus condition.

5. An interchangeable lens apparatus comprising:
a zoom lens system as claimed in claim 1; and
a lens mount section which is connectable to a camera body including an image sensor for receiving an optical image formed by the zoom lens system and converting the optical image into an electric image signal.

6. A camera system comprising:
an interchangeable lens apparatus including a zoom lens system as claimed in claim 1; and
a camera body which is detachably connected to the interchangeable lens apparatus via a camera mount section, and includes an image sensor for receiving an optical image formed by the zoom lens system and converting the optical image into an electric image signal.

* * * * *